US012120487B2

(12) United States Patent
Higgins et al.

(10) Patent No.: US 12,120,487 B2
(45) Date of Patent: Oct. 15, 2024

(54) MODULAR CONNECTION ASSEMBLY FOR A HEARING ASSISTANCE DEVICE

(71) Applicant: Starkey Laboratories, Inc., Eden Prairie, MN (US)

(72) Inventors: Sidney A. Higgins, Maple Grove, MN (US); James R. Newton, Burnsville, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 0 days.

(21) Appl. No.: 18/332,281

(22) Filed: Jun. 9, 2023

(65) Prior Publication Data

US 2023/0388727 A1 Nov. 30, 2023

Related U.S. Application Data

(63) Continuation of application No. 17/650,793, filed on Feb. 11, 2022, now Pat. No. 11,711,660, which is a
(Continued)

(51) Int. Cl.
*H04R 25/00* (2006.01)
*H04R 25/02* (2006.01)

(52) U.S. Cl.
CPC ........... *H04R 25/607* (2019.05); *H04R 25/02* (2013.01); *H04R 25/55* (2013.01); *H04R 2225/0216* (2019.05); *H04R 2225/025* (2013.01)

(58) Field of Classification Search
CPC ...... H04R 25/607; H04R 25/02; H04R 25/55; H04R 25/554; H04R 25/60; H04R 25/603;
(Continued)

(56) References Cited

U.S. PATENT DOCUMENTS 2,327,320 A 8/1943 Shapiro
3,728,509 A 4/1973 Shimojo
(Continued)

FOREIGN PATENT DOCUMENTS

DE 1247402 8/1967
DE 3006235 A1 10/1980
(Continued)

OTHER PUBLICATIONS

"U.S. Appl. No. 10/894,576, Non-Final Office Action mailed Jul. 2, 2007", 12 pgs.
(Continued)

*Primary Examiner* — Yogeshkumar Patel
(74) *Attorney, Agent, or Firm* — Schwegman Lundberg & Woessner, P.A.

(57) ABSTRACT

The present subject matter relates to an improved connection assembly for hearing assistance devices. The improved connection assembly provides a connection system that is reliable, straightforward to manufacture, and easy to use. The present connection assembly provides a rapid replacement option for the cable and/or the receiver or other electronics connected to the cable. The present subject matter provides for a connection assembly that can be extended to provide connections for a variety of applications which are not limited to a speaker (receiver) in the ear. Sensors and new configurations of component placement are supported using the present assembly, including, but not limited to telecoils, and GMR or TMR sensors, Various electromagnetic interference issues are addressed. In some examples a shielded set of wires are included. In some examples a twisted pair of wires is included. Various combinations of wires for different applications are supported with the present connector system.

20 Claims, 17 Drawing Sheets

Related U.S. Application Data continuation of application No. 16/889,024, filed on Jun. 1, 2020, now Pat. No. 11,252,521, which is a continuation of application No. 16/377,643, filed on Apr. 8, 2019, now Pat. No. 10,674,286, which is a continuation of application No. 15/632,742, filed on Jun. 26, 2017, now Pat. No. 10,257,622, which is a continuation of application No. 14/301,103, filed on Jun. 10, 2014, now Pat. No. 9,693,154, which is a continuation of application No. 12/548,051, filed on Aug. 26, 2009, now Pat. No. 8,781,141.

(60) Provisional application No. 61/092,336, filed on Aug. 27, 2008, provisional application No. 61/138,066, filed on Dec. 16, 2008, provisional application No. 61/142,125, filed on Dec. 31, 2008.

(58) Field of Classification Search
CPC .... H04R 25/606; H04R 25/609; H04R 25/43; H04R 2225/0216; H04R 2225/025
See application file for complete search history.

(56) References Cited

U.S. PATENT DOCUMENTS

| | | | |
|---|---|---|---|
| 3,812,300 | A | 5/1974 | Brander et al. |
| 4,017,834 | A | 4/1977 | Cuttill et al. |
| 4,310,213 | A | 1/1982 | Fetterolf, Sr. et al. |
| 4,564,955 | A | 1/1986 | Birch et al. |
| 4,571,464 | A | 2/1986 | Segero |
| 4,729,166 | A | 3/1988 | Lee et al. |
| 4,756,312 | A * | 7/1988 | Epley .................. H04R 25/606 607/57 |
| 5,606,621 | A | 2/1997 | Reiter et al. |
| 5,640,457 | A | 6/1997 | Gnecco et al. |
| 5,687,242 | A | 11/1997 | Iburg |
| 5,708,720 | A | 1/1998 | Meyer |
| 5,740,261 | A | 4/1998 | Loeppert et al. |
| 5,755,743 | A | 5/1998 | Volz et al. |
| 5,802,183 | A | 9/1998 | Scheller et al. |
| 5,824,968 | A | 10/1998 | Packard et al. |
| 5,825,894 | A | 10/1998 | Shennib |
| 5,906,635 | A * | 5/1999 | Maniglia .............. H04R 25/606 607/57 |
| 5,987,146 | A | 11/1999 | Pluvinage et al. |
| 6,031,923 | A | 2/2000 | Gnecco et al. |
| 6,167,138 | A | 12/2000 | Shennib |
| 6,563,045 | B2 | 5/2003 | Goett et al. |
| 6,766,030 | B1 | 7/2004 | Chojar |
| 6,876,074 | B2 | 4/2005 | Kim |
| 6,985,598 | B1 | 1/2006 | Joschika |
| 7,003,127 | B1 | 2/2006 | Sjursen et al. |
| 7,016,512 | B1 | 3/2006 | Feeley et al. |
| 7,065,224 | B2 | 6/2006 | Cornelius et al. |
| 7,110,562 | B1 | 9/2006 | Feeley et al. |
| 7,139,404 | B2 | 11/2006 | Feeley et al. |
| 7,142,682 | B2 | 11/2006 | Mullenborn et al. |
| 7,181,035 | B2 | 2/2007 | Van Halteren et al. |
| 7,256,747 | B2 | 8/2007 | Victorian et al. |
| 7,320,832 | B2 | 1/2008 | Palumbo et al. |
| 7,354,354 | B2 | 4/2008 | Palumbo et al. |
| 7,446,720 | B2 | 11/2008 | Victorian et al. |
| 7,460,681 | B2 | 12/2008 | Geschiere et al. |
| 7,471,182 | B2 | 12/2008 | Kumano et al. |
| 7,593,538 | B2 | 9/2009 | Polinske |
| 7,720,244 | B2 | 5/2010 | Espersen et al. |
| 8,098,863 | B2 | 1/2012 | Ho et al. |
| 8,103,039 | B2 | 1/2012 | Van Halteren et al. |
| 8,116,495 | B2 | 2/2012 | Spaulding |
| 8,259,975 | B2 | 9/2012 | Bally et al. |
| 8,295,517 | B2 | 10/2012 | Gottschalk et al. |
| 8,385,573 | B2 | 2/2013 | Higgins |
| 8,494,195 | B2 | 7/2013 | Higgins |
| 8,638,965 | B2 | 1/2014 | Higgins et al. |
| 8,705,785 | B2 | 4/2014 | Link et al. |
| 8,781,141 | B2 | 7/2014 | Higgins et al. |
| 8,798,299 | B1 | 8/2014 | Higgins et al. |
| 8,861,761 | B2 | 10/2014 | Higgins |
| 8,908,895 | B2 | 12/2014 | Würfel |
| 9,049,526 | B2 | 6/2015 | Higgins |
| 9,654,887 | B2 | 5/2017 | Link et al. |
| 9,693,154 | B2 | 6/2017 | Higgins et al. |
| 10,051,390 | B2 | 8/2018 | Link et al. |
| 10,257,622 | B2 | 4/2019 | Higgins et al. |
| 10,448,176 | B2 | 10/2019 | Link et al. |
| 10,674,286 | B2 | 6/2020 | Higgins et al. |
| 11,064,304 | B2 | 7/2021 | Link et al. |
| 11,252,521 | B2 | 2/2022 | Higgins et al. |
| 11,711,660 | B2 | 7/2023 | Higgins et al. |
| 11,765,531 | B2 | 9/2023 | Link et al. |
| 2001/0033664 | A1 | 10/2001 | Poux et al. |
| 2002/0027996 | A1 * | 3/2002 | Leedom ................. H04R 25/65 381/328 |
| 2002/0061113 | A1 | 5/2002 | van Halteren et al. |
| 2002/0074633 | A1 | 6/2002 | Larson et al. |
| 2002/0131614 | A1 | 9/2002 | Jakob et al. |
| 2003/0152243 | A1 * | 8/2003 | Julstrom .............. H04R 25/554 381/315 |
| 2003/0178247 | A1 | 9/2003 | Saltykov |
| 2003/0200820 | A1 * | 10/2003 | Takada .................. H04R 11/04 73/862.626 |
| 2004/0010181 | A1 * | 1/2004 | Feeley .................. H04R 25/60 381/322 |
| 2004/0028251 | A1 | 2/2004 | Kasztelan et al. |
| 2004/0114776 | A1 | 6/2004 | Crawford et al. |
| 2004/0240693 | A1 | 12/2004 | Rosenthal |
| 2005/0008178 | A1 | 1/2005 | Joergensen et al. |
| 2005/0111685 | A1 | 5/2005 | Gabathuler |
| 2006/0007376 | A1 | 1/2006 | Fukuda et al. |
| 2006/0008110 | A1 | 1/2006 | Van Halteren |
| 2006/0018495 | A1 | 1/2006 | Geschiere et al. |
| 2006/0078142 | A1 | 4/2006 | Neilson |
| 2006/0097376 | A1 | 5/2006 | Leurs et al. |
| 2006/0159298 | A1 | 7/2006 | Von Dombrowski et al. |
| 2006/0227989 | A1 | 10/2006 | Polinske |
| 2007/0009130 | A1 | 1/2007 | Feeley et al. |
| 2007/0014423 | A1 | 1/2007 | Darbut et al. |
| 2007/0036374 | A1 | 2/2007 | Bauman et al. |
| 2007/0121979 | A1 | 5/2007 | Zhu et al. |
| 2007/0147630 | A1 | 6/2007 | Chiloyan |
| 2007/0173683 | A1 | 7/2007 | Harrison et al. |
| 2007/0188289 | A1 | 8/2007 | Kumano et al. |
| 2007/0248234 | A1 | 10/2007 | Ho et al. |
| 2008/0003736 | A1 | 1/2008 | Arai et al. |
| 2008/0013766 | A1 | 1/2008 | Kral et al. |
| 2008/0026220 | A9 | 1/2008 | Bi et al. |
| 2008/0081492 | A1 | 4/2008 | Sawatari et al. |
| 2008/0187157 | A1 | 8/2008 | Higgins |
| 2008/0199971 | A1 | 8/2008 | Tondra |
| 2008/0260193 | A1 | 10/2008 | Westermann et al. |
| 2009/0067661 | A1 | 3/2009 | Keady et al. |
| 2009/0074218 | A1 | 3/2009 | Higgins |
| 2009/0075083 | A1 | 3/2009 | Bi et al. |
| 2009/0196444 | A1 | 8/2009 | Solum |
| 2009/0245558 | A1 | 10/2009 | Spaulding |
| 2009/0252365 | A1 | 10/2009 | Lin |
| 2009/0262964 | A1 | 10/2009 | Havenith et al. |
| 2010/0034410 | A1 | 2/2010 | Douglas et al. |
| 2010/0074461 | A1 | 3/2010 | Polinske |
| 2010/0124346 | A1 | 5/2010 | Higgins |
| 2010/0135513 | A1 | 6/2010 | Geschiere et al. |
| 2010/0158291 | A1 | 6/2010 | Polinske et al. |
| 2010/0158293 | A1 | 6/2010 | Polinske et al. |
| 2010/0158295 | A1 | 6/2010 | Polinske et al. |
| 2011/0044485 | A1 | 2/2011 | Lin et al. |
| 2012/0014549 | A1 * | 1/2012 | Higgins ................. H01R 24/62 29/874 |
| 2012/0263328 | A1 | 10/2012 | Higgins |
| 2013/0230197 | A1 | 9/2013 | Higgins |
| 2014/0355803 | A1 | 12/2014 | Higgins et al. |
| 2015/0086051 | A1 | 3/2015 | Link et al. |
| 2015/0163601 | A1 | 6/2015 | Higgins |
| 2017/0318402 | A1 | 11/2017 | Link et al. |

(56) References Cited

U.S. PATENT DOCUMENTS

| | | | |
|---|---|---|---|
| 2017/0359662 | A1 | 12/2017 | Higgins et al. |
| 2018/0352347 | A1 | 12/2018 | Link et al. |
| 2019/0335280 | A1 | 10/2019 | Higgins et al. |
| 2020/0154219 | A1 | 5/2020 | Link et al. |
| 2020/0366997 | A1 | 11/2020 | Higgins et al. |
| 2022/0007119 | A1 | 1/2022 | Link et al. |
| 2022/0248151 | A1 | 8/2022 | Higgins et al. |
| 2024/0031748 | A1 | 1/2024 | Link et al. |

FOREIGN PATENT DOCUMENTS

| | | | |
|---|---|---|---|
| DE | 3502178 | A1 | 8/1985 |
| DE | 3643124 | A1 | 7/1988 |
| DE | 4005476 | A1 | 7/1991 |
| DE | 9320391 | U1 | 9/1993 |
| DE | 4233813 | C1 | 11/1993 |
| DE | 9408054 | U1 | 5/1994 |
| DE | 29801567 | U1 | 5/1998 |
| DE | 102008045668 | A1 | 9/2008 |
| EP | 0339877 | A3 | 11/1989 |
| EP | 0424916 | B1 | 7/1995 |
| EP | 0866637 | A2 | 9/1998 |
| EP | 1065863 | A2 | 1/2001 |
| EP | 1209948 | A2 | 5/2002 |
| EP | 1465457 | A2 | 10/2004 |
| EP | 1496530 | A2 | 1/2005 |
| EP | 1209948 | A3 | 7/2006 |
| EP | 1811808 | A1 | 7/2007 |
| EP | 1816893 | A1 | 8/2007 |
| EP | 1850630 | A2 | 10/2007 |
| EP | 1916561 | A2 | 4/2008 |
| EP | 1916561 | A3 | 4/2008 |
| EP | 1920634 | B1 | 2/2009 |
| EP | 2040343 | A1 | 3/2009 |
| EP | 2107829 | B1 | 5/2012 |
| EP | 2509341 | A1 | 10/2012 |
| EP | 2160047 | B1 | 10/2013 |
| EP | 2509341 | B1 | 6/2014 |
| GB | 1298089 | | 11/1972 |
| GB | 1522549 | | 8/1978 |
| GB | 1522549 | B3 | 8/1978 |
| JP | 2209967 | A | 8/1990 |
| JP | 2288116 | A | 11/1990 |
| JP | 09199662 | A | 7/1997 |
| WO | WO-9741710 | A1 | 11/1997 |
| WO | WO-0079832 | A2 | 12/2000 |
| WO | WO-0143497 | A1 | 6/2001 |
| WO | WO-2004025990 | A1 | 3/2004 |
| WO | WO-06094502 | A1 | 9/2006 |
| WO | WO-2006094502 | A1 | 9/2006 |
| WO | WO-2007027152 | A1 | 3/2007 |
| WO | WO-2007112404 | A2 | 10/2007 |
| WO | WO-2007112404 | A3 | 10/2007 |
| WO | WO-2007140403 | A2 | 12/2007 |
| WO | WO-2007140403 | A3 | 12/2007 |
| WO | WO-2007148154 | A1 | 12/2007 |
| WO | WO-2008092265 | A1 | 8/2008 |
| WO | WO-2008097600 | A1 | 8/2008 |
| WO | WO-2008097600 | C1 | 8/2008 |
| WO | WO-2011101041 | A1 | 8/2011 |

OTHER PUBLICATIONS

"U.S. Appl. No. 10/894,576, Non-Final Office Action mailed Dec. 18, 2007", 11 pgs.
"U.S. Appl. No. 10/894,576, Notice of Allowance mailed Aug. 5, 2008", 7 pgs.
"U.S. Appl. No. 10/894,576, Response filed Apr. 18, 2008 to Non-Final Office Action mailed Dec. 18, 2007", 10 pgs.
"U.S. Appl. No. 10/894,576, Response filed Oct. 1, 2007 to Non-Final Office Action mailed Jul. 2, 2007", 10 pgs.
"U.S. Appl. No. 11/857,439, Final Office Action mailed Feb. 29, 2012", 16 pgs.
"U.S. Appl. No. 11/857,439, Non Final Office Action mailed Aug. 17, 2011", 16 pgs.
"U.S. Appl. No. 11/857,439, Notice of Allowance mailed May 30, 2012", 9 pgs.
"U.S. Appl. No. 11/857,439, Notice of Allowance mailed Sep. 19, 2012", 9 pgs.
"U.S. Appl. No. 11/857,439, Response filed Apr. 30, 2012 to Final Office Action mailed Feb. 29, 2012", 9 pgs.
"U.S. Appl. No. 11/857,439, Response filed Jun. 13, 2011 to Restriction Requirement mailed May 11, 2011", 8 pgs.
"U.S. Appl. No. 11/857,439, Response filed Dec. 17, 2011 to Non Final Office Action mailed Aug. 17, 2011", 12 pgs.
"U.S. Appl. No. 11/857,439, Restriction Requirement mailed May 11, 2011", 6 pgs.
"U.S. Appl. No. 12/027,173, Final Office Action mailed Dec. 8, 2011", 12 pgs.
"U.S. Appl. No. 12/027,173, Non Final Office Action mailed Jul. 11, 2011", 10 pgs.
"U.S. Appl. No. 12/027,173, Non Final Office Action mailed Jul. 27, 2012", 11 pgs.
"U.S. Appl. No. 12/027,173, Notice of Allowance mailed Mar. 19, 2013", 8 pgs.
"U.S. Appl. No. 12/027,173, Response filed Jun. 8, 2012 to Final Office Action mailed Dec. 8, 2011", 7 pgs.
"U.S. Appl. No. 12/027,173, Response filed Nov. 14, 2011 to Non Final Office Action mailed Jul. 11, 2011", 8 pgs.
"U.S. Appl. No. 12/027,173, Response filed Dec. 26, 2012 to Non Final Office Action mailed Jul. 27, 2012", 8 pgs.
"U.S. Appl. No. 12/059,578, Notice of Allowance mailed Oct. 5, 2011", 8 pgs.
"U.S. Appl. No. 12/325,838, Non Final Office Action mailed Jun. 16, 2011", 5 pgs.
"U.S. Appl. No. 12/539,195, Advisory Action mailed Apr. 23, 2013", 3 pgs.
"U.S. Appl. No. 12/539,195, Final Office Action mailed Feb. 11, 2013", 15 pgs.
"U.S. Appl. No. 12/539,195, Non Final Office Action mailed Jul. 20, 2012", 13 pgs.
"U.S. Appl. No. 12/539,195, Non Final Office Action mailed Aug. 2, 2013", 14 pgs.
"U.S. Appl. No. 12/539,195, Notice of Allowance mailed Nov. 29, 2013", 12 pgs.
"U.S. Appl. No. 12/539,195, Response filed Apr. 11, 2013 to Final Office Action mailed Feb. 11, 2013", 7 pgs.
"U.S. Appl. No. 12/539,195, Response filed Nov. 4, 2013 to Non Final Office Action mailed Aug. 2, 2013", 7 pgs.
"U.S. Appl. No. 12/539,195, Response filed Dec. 20, 2012 to Non Final Office Action mailed Jul. 20, 2012", 7 pgs.
"U.S. Appl. No. 12/548,051, Final Office Action mailed Apr. 19, 2012", 12 pgs.
"U.S. Appl. No. 12/548,051, Non Final Office Action mailed Jan. 24, 2013", 12 pgs.
"U.S. Appl. No. 12/548,051, Non Final Office Action mailed Oct. 12, 2011", 11 pgs.
"U.S. Appl. No. 12/548,051, Notice of Allowance mailed Jul. 31, 2013", 14 pgs.
"U.S. Appl. No. 12/548,051, Response filed Jan. 12, 2012 to Non Final Office Action mailed Oct. 12, 2011", 9 pgs.
"U.S. Appl. No. 12/548,051, Response filed Apr. 24, 2013 to Non Final Office Action mailed Jan. 24, 2013", 8 pgs.
"U.S. Appl. No. 12/548,051, Response filed Sep. 19, 2012 to Final Office Action mailed Apr. 19, 2012", 8 pgs.
"U.S. Appl. No. 12/644,188, Advisory Action mailed Jul. 25, 2013", 3 pgs.
"U.S. Appl. No. 12/644,188, Final Office Action mailed May 22, 2013", 7 pgs.
"U.S. Appl. No. 12/644,188, Non Final Office Action mailed Sep. 9, 2013", 9 pgs.
"U.S. Appl. No. 12/644,188, Non Final Office Action mailed Sep. 19, 2012", 8 pgs.
"U.S. Appl. No. 12/644,188, Notice of Allowance mailed Mar. 21, 2014", 5 pgs.

(56) References Cited

OTHER PUBLICATIONS

"U.S. Appl. No. 12/644,188, Response filed Feb. 19, 2013 to Non Final Office Action mailed Sep. 19, 2012", 6 pgs.
"U.S. Appl. No. 12/644,188, Response filed Jul. 22, 2013 to Final Office Action mailed May 22, 2013", 6 pgs.
"U.S. Appl. No. 12/644,188, Response filed Dec. 9, 2013 to Non Final Office Action mailed Sep. 9, 2013", 6 pgs.
"U.S. Appl. No. 12/842,305, Examiner Interview Summary mailed Apr. 19, 2013", 3 pgs.
"U.S. Appl. No. 12/842,305, Non Final Office Action mailed Jan. 17, 2014", 8 pgs.
"U.S. Appl. No. 12/842,305, Response filed Apr. 8, 2013 to Restriction Requirement mailed Feb. 8, 2013", 6 pgs.
"U.S. Appl. No. 12/842,305, Response filed Apr. 17, 2014 to Non Final Office Action mailedJan. 17, 2014", 9 pgs.
"U.S. Appl. No. 12/842,305, Restriction Requirement mailed Feb. 8, 2013", 6 pgs.
"U.S. Appl. No. 13/181,752, Final Office Action mailed Jul. 11, 2013", 7 pgs.
"U.S. Appl. No. 13/181,752, Non Final Office Action mailed Mar. 5, 2013", 7 pgs.
"U.S. Appl. No. 13/181,752, Notice of Allowance mailed Sep. 25, 2013", 9 pgs.
"U.S. Appl. No. 13/181,752, Response filed Jun. 5, 2013 to Non Final Office Action mailed Mar. 5, 2013", 8 pgs.
"U.S. Appl. No. 13/181,752, Response filed Sep. 11, 2013 to Final Office Action mailed Jul. 11, 2013", 8 pgs.
"U.S. Appl. No. 13/422,177, Advisory Action mailed Jun. 9, 2014", 3 pgs.
"U.S. Appl. No. 13/422,177, Final Office Action mailed Feb. 27, 2014", 12 pgs.
"U.S. Appl. No. 13/422,177, Non Final Office Action mailed Jul. 16, 2014", 12 pgs.
"U.S. Appl. No. 13/422,177, Non Final Office Action mailed Sep. 26, 2013", 10 pgs.
"U.S. Appl. No. 13/422,177, Notice of Allowance mailed Feb. 3, 2015", 8 pgs.
"U.S. Appl. No. 13/422,177, Response filed Apr. 28, 2014 to Final Office Action mailed Feb. 27, 2014", 9 pgs.
"U.S. Appl. No. 13/422,177, Response filed Oct. 16, 2014 to Non Final Office Action mailed Jul. 16, 2014", 10 pgs.
"U.S. Appl. No. 13/422,177, Response filed Dec. 20, 2013 to Non Final Office Action mailed Sep. 26, 2013", 8 pgs.
"U.S. Appl. No. 13/776,557, Final Office Action mailed Mar. 20, 2014", 8 pgs.
"U.S. Appl. No. 13/776,557, Non Final Office Action mailed Oct. 22, 2013", 6 pgs.
"U.S. Appl. No. 13/776,557, Notice of Allowance mailed Jun. 13, 2014", 8 pgs.
"U.S. Appl. No. 13/776,557, Response filed Jan. 22, 2014 to Non Final Office Action mailed Oct. 22, 2013", 6 pgs.
"U.S. Appl. No. 13/776,557, Response filed May 15, 2014 to Final Office Action mailed Mar. 20, 2014", 7 pgs.
"U.S. Appl. No. 14/257,537, Advisory Action mailed Jul. 14, 2016", 6 pgs.
"U.S. Appl. No. 14/257,537, Advisory Action mailed Oct. 21, 2015", 2 pgs.
"U.S. Appl. No. 14/257,537, Appeal Brief filed Oct. 27, 2016", 15 pgs.
"U.S. Appl. No. 14/257,537, Decision mailed Aug. 15, 2016 on Pre-Appeal Brief Request filed Jul. 27, 2016", 4 pgs.
"U.S. Appl. No. 14/257,537, Final Office Action mailed Apr. 27, 2016", 20 pgs.
"U.S. Appl. No. 14/257,537, Final Office Action mailed Aug. 3, 2015", 16 pgs.
"U.S. Appl. No. 14/257,537, Non Final Office Action mailed Mar. 19, 2015", 19 pgs.
"U.S. Appl. No. 14/257,537, Non Final Office Action mailed Nov. 17, 2015", 20 pgs.
"U.S. Appl. No. 14/257,537, Notice of Allowance mailed Jan. 13, 2017", 10 pgs.
"U.S. Appl. No. 14/257,537, Pre-Appeal Brief Request filed Jul. 27, 2016", 4 pgs.
"U.S. Appl. No. 14/257,537, Response filed Feb. 17, 2016 to Non Final Office Action mailed Nov. 17, 2015", 19 pgs.
"U.S. Appl. No. 14/257,537, Response filed Jun. 19, 2015 to Non Final Office Action mailed Mar. 19, 2015", 6 pgs.
"U.S. Appl. No. 14/257,537, Response filed Jun. 27, 2016 to Final Office Action mailed Apr. 27, 2016", 8 pgs.
"U.S. Appl. No. 14/257,537, Response filed Oct. 5, 2015 to Final Office Action mailed Aug. 3, 2015", 8 pgs.
"U.S. Appl. No. 14/257,537, Response filed Nov. 3, 2015 to Advisory Action mailed Oct. 21, 2015", 8 pgs.
"U.S. Appl. No. 14/301,103, Advisory Action mailed Jun. 10, 2016", 3 pgs.
"U.S. Appl. No. 14/301,103, Final Office Action mailed Mar. 25, 2016", 11 pgs.
"U.S. Appl. No. 14/301,103, Non Final Office Action mailed Dec. 2, 2015", 9 pgs.
"U.S. Appl. No. 14/301,103, Non-Final Office Action mailed Jul. 28, 2016", 10 pgs.
"U.S. Appl. No. 14/301,103, Notice of Allowance mailed Feb. 15, 2017", 8 pgs.
"U.S. Appl. No. 14/301,103, Preliminary Amendment Filed Jul. 1, 2014", 5 pgs.
"U.S. Appl. No. 14/301,103, Response filed Mar. 2, 2016 to Non Final Office Action mailed Dec. 2, 2015", 6 pgs.
"U.S. Appl. No. 14/301,103, Response filed May 25, 2016 to Final Office Action mailed Mar. 25, 2016", 7 pgs.
"U.S. Appl. No. 14/301,103, Response filed Oct. 28, 2016 to Non-Final Office Action mailed Jul. 28, 2016", 6 pgs.
"U.S. Appl. No. 14/512,560, Non Final Office Action mailed Jan. 29, 2016", 9 pgs.
"U.S. Appl. No. 15/595,302, Non Final Office Action mailed Nov. 30, 2017", 19 pgs.
"U.S. Appl. No. 15/595,302, Notice of Allowance mailed Apr. 11, 2018", 10 pgs.
"U.S. Appl. No. 15/595,302, Preliminary Amendment filed Jul. 24, 2017", 5 pgs.
"U.S. Appl. No. 15/595,302, Response filed Feb. 28, 2018 to Non Final Office Action mailed Nov. 30, 2017", 7 pgs.
"U.S. Appl. No. 15/632,742, Non Final Office Action mailed Feb. 7, 2018", 11 pgs.
"U.S. Appl. No. 15/632,742, Notice of Allowance mailed Nov. 28, 2018", 9 pgs.
"U.S. Appl. No. 15/632,742, Preliminary Amendment filed Sep. 5, 2017", 6 pgs.
"U.S. Appl. No. 15/632,742, Response Filed May 7, 2018 to Non Final Office Action mailed Feb. 7, 2018", 7 pgs.
"U.S. Appl. No. 16/058,335, Final Office Action mailed Mar. 28, 2019", 9 pgs.
"U.S. Appl. No. 16/058,335, Non Final Office Action mailed Oct. 11, 2018", 19 pgs.
"U.S. Appl. No. 16/058,335, Notice of Allowance mailed Jun. 6, 2019", 10 pgs.
"U.S. Appl. No. 16/058,335, Response Filed Jan. 11, 2019 to Non Final Office Action mailed Oct. 11, 2018", 8 pgs.
"U.S. Appl. No. 16/058,335, Response filed May 23, 2019 to Final Office Action mailed Mar. 28, 2019", 6 pgs.
"U.S. Appl. No. 16/377,643, Non Final Office Action mailed Oct. 10, 2019", 10 pgs.
"U.S. Appl. No. 16/377,643, Notice of Allowance mailed Jan. 24, 2020", 9 pgs.
"U.S. Appl. No. 16/377,643, Preliminary Amendment filed Jul. 22, 2019", 5 pgs.
"U.S. Appl. No. 16/377,643, Response filed Jan. 9, 2020 to Non Final Office Action mailed Oct. 10, 2019", 8 pgs.
"U.S. Appl. No. 16/377,643, Supplemental Notice of Allowability mailed Apr. 28, 2020", 2 pgs.
"U.S. Appl. No. 16/599,524, Final Office Action mailed Jan. 11, 2021", 15 pgs.

(56) References Cited

OTHER PUBLICATIONS

"U.S. Appl. No. 16/599,524, Non Final Office Action mailed Aug. 6, 2020", 25 pgs.
"U.S. Appl. No. 16/599,524, Notice of Allowance mailed Mar. 18, 2021", 9 pgs.
"U.S. Appl. No. 16/599,524, Preliminary Amendment filed Jan. 31, 2020", 5 pgs.
"U.S. Appl. No. 16/599,524, Response filed Mar. 3, 2021 to Final Office Action mailed Jan. 11, 2021", 6 pgs.
"U.S. Appl. No. 16/599,524, Response filed Nov. 5, 2020 to Non Final Office Action mailed Aug. 6, 2020", 8 pgs.
"U.S. Appl. No. 16/889,024, Non Final Office Action mailed Jun. 28, 2021", 12 pgs.
"U.S. Appl. No. 16/889,024, Notice of Allowance mailed Oct. 5, 2021", 9 pgs.
"U.S. Appl. No. 16/889,024, Preliminary Amendment filed Aug. 10, 2020", 5 pgs.
"U.S. Appl. No. 16/889,024, Response filed Sep. 23, 2021 to Non Final Office Action mailed Jun. 28, 2021", 8 pgs.
"U.S. Appl. No. 17/372,745, Advisory Action mailed Apr. 5, 2023", 3 pgs.
"U.S. Appl. No. 17/372,745, Final Office Action mailed Jan. 23, 2023", 27 pgs.
"U.S. Appl. No. 17/372,745, Non Final Office Action mailed Aug. 29, 2022", 23 pgs.
"U.S. Appl. No. 17/372,745, Notice of Allowance mailed May 8, 2023", 8 pgs.
"U.S. Appl. No. 17/372,745, Preliminary Amendment filed Sep. 23, 2021", 6 pgs.
"U.S. Appl. No. 17/372,745, Response filed Mar. 23,2023 to Final Office Action mailed Jan. 23, 2023", 11 pgs.
"U.S. Appl. No. 17/372,745, Response filed Nov. 29, 2022 to Non Final Office Action mailed Aug. 29, 2022", 10 pgs.
"U.S. Appl. No. 17/650,793, Notice of Allowance mailed Mar. 7, 2023", 9 pgs.
"U.S. Appl. No. 17/650,793, Preliminary Amendment filed Apr. 22, 2022", 5 pgs.
"U.S. Appl. No. 16/058,335, Preliminary Amendment", 5 pgs.
"European Application Serial No. 12167845.2, Extended EP Search Report mailed Sep. 12, 2012", 6 pgs.
"European Application Serial No. 08253065.0, European Examination Notification mailed Oct. 11, 2011", 7 pgs.
"European Application Serial No. 08253065.0, European Office Action mailed Aug. 26, 2010", 6 Pgs.
"European Application Serial No. 08253065.0, Extended Search Report Mailed Dec. 15, 2008", 9 pgs.
"European Application Serial No. 08253065.0, Office Action mailed Jul. 17, 2009", 1 pg.
"European Application Serial No. 08253065.0, Response filed Jan. 26, 2010 to Office Action mailed Jul. 17, 2009", 9 pgs.
"European Application Serial No. 08253065.0, Response filed Feb. 8, 2012 to Examination Notification mailed Oct. 11, 2011", 15 pgs.
"European Application Serial No. 08253065.0, Response to Office Action filed Feb. 28, 2011 to European Office Action mailed Aug. 26, 2010", 17 pgs.
"European Application Serial No. 08725262.3, Appeal Decision mailed Jul. 29, 2013", 7 pgs.
"European Application Serial No. 08725262.3, EPO Written Decision to Refuse mailed Oct. 19, 2012", 14 pgs.
"European Application Serial No. 08725262.3, Office Action mailed Apr. 21, 2010", 6 Pgs.
"European Application Serial No. 08725262.3, Office Action mailed Aug. 5, 2011", 5 pgs.
"European Application Serial No. 08725262.3, Response filed Feb. 13, 2012 to Office Action mailed Aug. 5, 2011", 11 pgs.
"European Application Serial No. 08725262.3, Response Filed Nov. 2, 2010 to Office Action mailed Apr. 21, 2010", 14 pgs.
"European Application Serial No. 08725262.3, Summons to Attend Oral Proceedings mailed Jun. 6, 2012", 5 pgs.
"European Application Serial No. 09168844.0, European Search Report mailed Apr. 19, 2010", 3 Pgs.
"European Application Serial No. 09168844.0, Office Action mailed Apr. 8, 2013", 5 pgs.
"European Application Serial No. 09168844.0, Office Action mailed Apr. 28, 2011", 5 pgs.
"European Application Serial No. 09168844.0, Office Action mailed May 14, 2012", 2 pgs.
"European Application Serial No. 09168844.0, Office Action mailed May 3, 2010", 5 pgs.
"European Application Serial No. 09168844.0, Response filed Feb. 24, 2012 to Office Action mailed Apr. 28, 2011", 12 pgs.
"European Application Serial No. 09168844.0, Response filed Jul. 24, 2012 to Examination Notification Art. 94(3) mailed May 14, 2012", 10 pgs.
"European Application Serial No. 09168844.0, Response Filed Nov. 15, 2010 to Office Action mailed May 3, 2010", 8 pgs.
"European Application Serial No. 09250729.2, Extended Search Report Mailed Dec. 14, 2009", 4 pgs.
"European Application Serial No. 10251319.9, Office Action mailed Jan. 3, 2012", 6 pgs.
"European Application Serial No. 10251319.9, Response filed Jul. 24, 2012 to Extended European Search Report mailed Jan. 3, 2012", 10 pgs.
"European Application Serial No. 12160102.5, Communication Pursuant to Article 94(3) EPC mailed Jul. 17, 2018", 6 pgs.
"European Application Serial No. 12160102.5, Extended European Search Report mailed Sep. 7, 2016", 8 pgs.
"European Application Serial No. 12167845.2, Response filed Apr. 10, 2013 to Extended European Search Report mailed Sep. 12, 2012", 14 pgs.
"European Application Serial No. 09168844.0, Office Action mailed Sep. 4, 2012", 4 pgs.
"European Application Serial No. 09168844.0, Response filed Mar. 14, 2013 to Office Action mailed Sep. 4, 2012", 34 pgs.
"International Application Serial No. PCT/US2008/001609, International Preliminary Report on Patentability mailed Aug. 20, 2009", 10 pgs.
"International Application Serial No. PCT/US2008/001609, Search Report mailed Jun. 19, 2008", 7 pgs.
"International Application Serial No. PCT/US2008/001609, Written Opinion mailed Jun. 19, 2008", 8 pgs.
Buchoff, L S, "Advanced Non-Soldering Interconnection", Electro International, 1991 (IEEE), XP 10305250A1, (1991), 248-251.
Tondra, Mark, "Flow Assay With Integrated Detector", U.S. Appl. No. 60/887,609, filed Feb. 1, 2007, 28 pgs.
U.S. Appl. No. 12/027,173 U.S. Pat. No. 8,494,195, filed Feb. 6, 2008, Electrical Contacts Using Conductive Silicone in Hearing Assistance Devices.
U.S. Appl. No. 13/948,031, filed Jul. 22, 2013, Electrical Contacts Using Conductive Silicone in Hearing Assistance Devices.
U.S. Appl. No. 11/857,439 U.S. Pat. No. 8,385,573, filed Sep. 19, 2007, System for Hearing Assistance Device Including Receiver in the Canal.
U.S. Appl. No. 13/776,557 U.S. Pat. No. 8,861,761, filed Feb. 25, 2013, System for Hearing Assistance Device Including Receiver in the Canal.
U.S. Appl. No. 14/512,560, filed Oct. 13, 2014, System for Hearing Assistance Device Including Receiver in the Canal.
U.S. Appl. No. 14/257,537 U.S. Pat. No. 9,654,887, filed Apr. 21, 2014, Hearing Aid Adapted for Embedded Electronics.
U.S. Appl. No. 12/539,195 U.S. Pat. No. 8,705,785, filed Aug. 11, 2009, Hearing Aid Adapted for Embedded Electronics.
U.S. Appl. No. 15/595,302 U.S. Pat. No. 10,051,390, filed May 15, 2017, Hearing Aid Adapted for Embedded Electronics.
U.S. Appl. No. 16/058,335 U.S. Pat. No. 10,448,176, filed Aug. 8, 2018, Hearing Aid Adapted for Embedded Electronics.
U.S. Appl. No. 16/599,524 U.S. Pat. No. 11,064,304, filed Oct. 11, 2019, Hearing Aid Adapted for Embedded Electronics.
U.S. Appl. No. 17/372,745 U.S. Pat. No. 11,765,531, filed Jul. 12, 2021, Hearing Aid Adapted for Embedded Electronics.
U.S. Appl. No. 18/366,967, filed Aug. 8, 2023, Hearing Aid Adapted for Embedded Electronics.

(56) References Cited

OTHER PUBLICATIONS

U.S. Appl. No. 12/644,188 U.S. Pat. No. 8,798,299, filed Dec. 22, 2009, Magnetic Shielding for Communication Device Applications.
U.S. Appl. No. 12/548,051 U.S. Pat. No. 8,781,141, filed Aug. 26, 2009, Modular Connection Assembly for a Hearing Assistance Device.
U.S. Appl. No. 14/301,103 U.S. Pat. No. 9,693,154, filed Jun. 10, 2014, Modular Connection Assembly for a Hearing Assistance Device.
U.S. Appl. No. 15/632,742 U.S. Pat. No. 10,257,622, filed Jun. 26, 2017, Modular Connection Assembly for a Hearing Assistance Device.
U.S. Appl. No. 16/377,643 U.S. Pat. No. 10,674,286, filed Apr. 8, 2019, Modular Connection Assembly for a Hearing Assistance Device.
U.S. Appl. No. 16/889,024 U.S. Pat. No. 11,252,521, filed Jun. 1, 2020, Modular Connection Assembly for a Hearing Assistance Device.
U.S. Appl. No. 17/650,793 U.S. Pat. No. 11,711,660, filed Feb. 11, 2022, Modular Connection Assembly for a Hearing Assistance Device.
U.S. Appl. No. 13/181,752 U.S. Pat. No. 8,638,965, filed Jul. 13, 2011, Receiver-in-Canal Hearing Device Cable Connections.
U.S. Appl. No. 14/141,725, filed Dec. 27, 2013, Receiver-in-Canal Hearing Device Cable Connections.
U.S. Appl. No. 13/422,177 U.S. Pat. No. 9,049,526, filed Mar. 16, 2012, Compact Programming Block Connector for Hearing Assistance Devices.
"U.S. Appl. No. 18/366,967, Preliminary Amendment filed Oct. 17, 2023", 5 pgs.

* cited by examiner

MODULAR CONNECTION ASSEMBLY FOR A HEARING ASSISTANCE DEVICE

CLAIM OF PRIORITY

This application is a continuation of U.S. patent application Ser. No. 17/650,793, filed Feb. 11, 2022, which is a continuation of U.S. patent application Ser. No. 16/889,024, filed Jun. 1, 2020, now issued as U.S. Pat. No. 11,252,521, which is a continuation of U.S. patent application Ser. No. 16/377,643, filed Apr. 8, 2019, now issued as U.S. Pat. No. 10,674,286, is a continuation of U.S. patent application Ser. No. 15/632,742, filed. Jun. 26, 2017, now issued as U.S. Pat. No. 10,257,622, is a continuation of U.S. patent application Ser. No. 14/301,103, filed Jun. 10, 2014, now issued as U.S. Pat. No. 9,693,154, which is a continuation of U.S. patent application Ser. No. 12/548,051, filed Aug. 26, 2009, now issued as U.S. Pat. No. 8,781,141, which application claims the benefit under 35 U.S.C. 119(e) of U.S. Provisional Patent Application Ser. No. 61/092,336, filed Aug. 27, 2008, U.S. Provisional Patent Application Ser. No. 61/138,066, filed Dec. 16, 2008, and U.S. Provisional Patent Application Ser. No. 61/142,125, filed Dec. 31, 2008, which applications are incorporated herein by reference in their entirety.

FIELD OF THE INVENTION

The present subject matter relates to hearing assistance devices and in particular to connections for hearing assistance devices.

BACKGROUND

Hearing assistance devices can feature speakers, also known as receivers, in or about the ear canal of a wearer. One type of hearing assistance device includes hearing aids. A hearing aid with a speaker (receiver) that is connected with wires to an electronics unit is called a receiver-in-the-ear (RITE) or receiver-in-the-canal (RIC) type hearing aid. The wires of MC and RITE type hearing aids are typically disposed in a tubing or jacket which is intended to be inconspicuous and reliable. The introduction of small wires in designs such as RIC and RITE type hearing aids create issues of reliability and ease of manufacture and use. Small wires can be difficult to connect and such connections are susceptible to deterioration or breakage from prolonged use. Components will wear out with use and may lose performance or fail to function. Additional problems arise when wires connected to a remote receiver, such as electromagnetic interference issues.

Thus, there is a need in the art for improved connections for hearing assistance devices. The connections should be reliable, easy to manufacture, and easy to use.

SUMMARY

The present subject matter relates to an improved connection assembly for hearing assistance devices. The improved connection assembly provides a connection system that is reliable, straightforward to manufacture, and easy to use. The present connection assembly provides a rapid replacement option for the cable and/or the receiver or other electronics connected to the cable. The present subject matter provides for a connection assembly that can be extended to provide connections for a variety of applications which are not limited to a speaker (receiver) in the ear. In various applications, improvements are provided for telecoil functionality. Other sensors and new configurations of component placement are supported using the present assembly, including, but not limited to GMR and IMR sensors. New configurations of electronics for e are supported. The present subject matter also addresses in various applications issues, such as water resistance, water proofing, and tamper resistance/proofing. Various electromagnetic interference issues are addressed. In some examples a shielded set of wires are included. In some examples a twisted pair of wires is included. Various combinations of wires for different applications are supported with the present connector system.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present invention refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is, therefore, not to be taken in a limiting sense, and the scope is defined only by the appended claims, along with the full scope of legal equivalents to which such claims are entitled.

Figure 1:
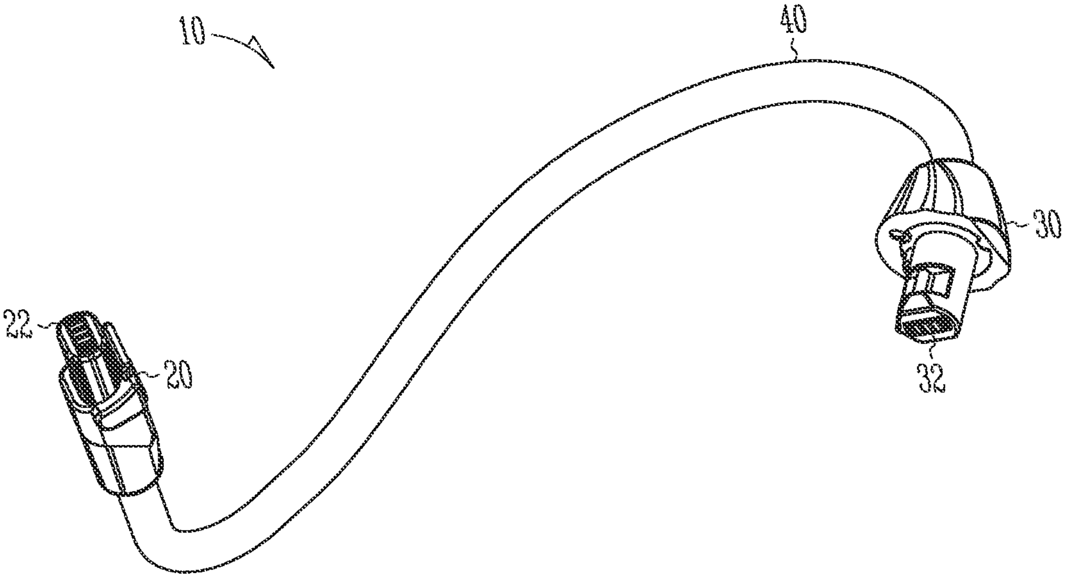
FIG. 1 shows a modular connection assembly for a hearing assistance device having a first connector and a second connector, according to one embodiment of the present subject matter.

FIG. 1 shows a modular connection assembly for a hearing assistance device having a first connector and a second connector, according to one embodiment of the present subject matter. Modular connection assembly 10 includes a first connector 20 and a second connector 30. The first connector 20 includes a plurality of contacts 22 connected to a plurality of contacts 32 of the second connector 30 using a plurality of wires in cable 40. The modular connection assembly 10 of FIG. 1 demonstrates five (5) contacts per connector, but it is understood that other numbers of contacts may be used without departing from the scope of the present subject matter. The modular connection assembly 10 can be used in a variety of applications, including, but not limited to, hearing aids featuring electronics connected to the first connector and electronics connected to the second connector. In various embodiments, the electronics connected to the first connector include, but are not limited to one or more of a receiver, a microphone, a telecoil, a sensor, or combinations thereof. In various embodiments, the electronics connected to the second connector 30 include, but are not limited to, a behind-the-ear type device, a receiver-in-the-canal type device, a receiver-in-the-ear type device, and an over the ear type of device.

Various wires can be used in cable 40, including, but not limited to, stranded Litz wires. In various embodiments, the wires in cable 40 are flexible. In various embodiments, the wires in cable 40 are enclosed in tubing. The tubing can be made of any flexible material, including, but not limited to PEBAX. Reinforced tubing, such as reinforced PEBAX may be used. With reinforcement, improvements in flex modulus of about five (5) times may be achieved and improvements of about ten (10) times the tensile and elongation strength of wall sections may be achieved. Other amounts of reinforcement improvement can be achieved without departing from the scope of the present subject matter.

The connectors 22 and 32 can include a variety of conductors, and can be adapted to connect to a variety of receptacles. In various embodiments, constant contact is ensured by an elastomeric component having conductive and nonconductive portions which is placed under compression when the connector is seated in the receptacle. One such connection approach is includes the use of conductive silicone in making the connections. In one approach, for example, a conductive silicone pad is placed in the receptacle and oriented so that its conductive and insulative regions are in alignment with a series of conductors on the connector and in the receptacle. Such designs include, but are not limited to, the approaches set forth in U.S. patent application Ser. No. 12/027,173 entitled: "Electrical Contacts Using Conductive Silicone in Hearing Assistance Devices" and Ser. No. 11/857,439 entitled: "System for Hearing Assistance Device Including Receiver in the Canal," the specifications of which are incorporated by reference in their entirety. One advantage of such connections is that they provide self-fitted interfaces. Another advantage is that if properly designed, such connections can be moisture resistant or moisture proof. Another advantage is that such connections reduce the need for very tight tolerance connections, which are difficult to produce and difficult to maintain. In one example application, a pad-to-pad variation of about 0.0002 inches (0.005 millimeters) is used. Other tolerances are possible, and this example is provide to illustrate a use of the present subject matter, but is not intended in an exclusive or exhaustive sense.

Connectors 20 and 30 may be color coded in various embodiments. Connectors 20 and 30 may be symmetrical in various embodiments. Connectors 20 and 30 may be asymmetrical in various embodiments. In various embodiments, connectors 20 and 30 include injection molded components. In various embodiments, connectors 20 and 30 include injection molded circuits. In various embodiments, connectors 20 and 30 are made using XYLEX; however, it is understood that other polymers can be used without departing from the scope of the present subject matter.

Figure 2:
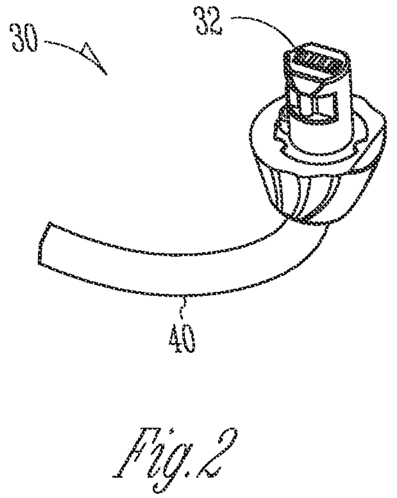
FIG. 2 shows an enlarged view of the second connector of the modular connection assembly of FIG. 1, according to one embodiment of the present subject matter.

FIG. 2 shows an enlarged view of the second connector of the modular connection assembly of FIG. 1, according to one embodiment of the present subject matter. Contacts 32 at the end of the connector 30 are visible. These contacts are connected to wires in cable 40. Various strain reliefs are possible without departing from the scope of the present subject matter and these are shown to demonstrate possible uses of the present technology, but are not intended in a limiting or exhaustive sense.

Figure 3:
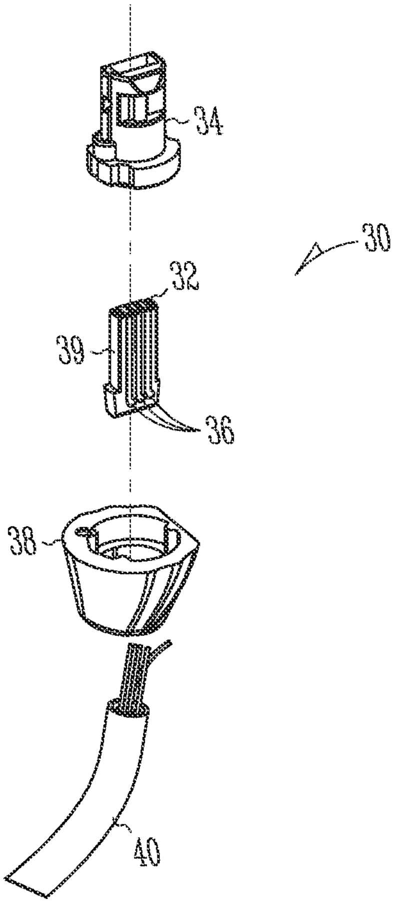
FIG. 3 shows an exploded view of the second connector of the modular connection assembly of FIG. 1, according to one embodiment of the present subject matter.
Figure 4:
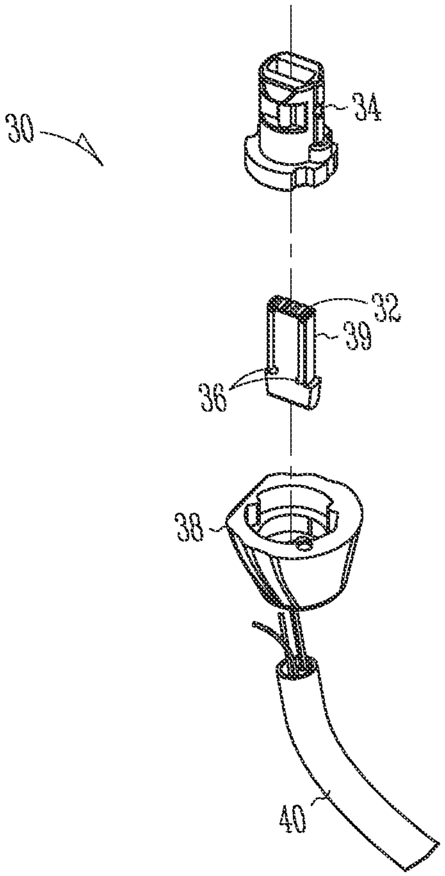
FIG. 4 shows an exploded view of the second connector of the modular connection assembly of FIG. 1, according to one embodiment of the present subject matter.

FIG. 3 shows an exploded view of the second connector of the modular connection assembly of FIG. 1, according to one embodiment of the present subject matter. In this example, an injection molded circuit component 39 is employed ("IMC 39"). IMC 39 is depicted showing five (5) contacts 32 and five (5) points of contact 36 are shown to illustrate one IMC 39, but it is understood that other connections are possible without departing from the scope of the present subject matter. For example, in some embodiments connection pads 36 are used to connect wires from the cable to contacts 32. Other numbers of contacts and connection pads and other types of components 39 with different configurations are possible without departing from the scope of the present subject matter. FIGS. 6A-6H demonstrate different views of two examples of types of components 39. In FIG. 3 one side of IMC 39 is shown with three connection pads 36, and FIG. 4 shows the other side with two connection pads 36. IMC 39 can be disposed within an insulative two part plug portion 34 and 38. One advantage of using polymers, such as XYLEX, is that various connector configurations can be made which allow for a good connection with a receptacle, both mechanically and electrically. The various connection pads 36 of DAC 39 are connected to wires in cable 40. These connections can be made by any type of connection method, including, but not limited to soldering. Such connections may be made by hand or using automation. The plug part 38 can be connected to tubing of cable 40 and act as a strain relief. The internal plug portion 34 includes a positive stop that allows the assembly of connector 30 with a receptacle. In embodiments using a flexible conductive interface, such as conductive silicone, the connector 30 is inserted into a receptacle until the stop is reached. This provides compression of the conductive silicone and a mechanical interface is provided which can be secured in position to provide reliable electrical contact and water resistance or water proofing. The stop allows the connector to provide a form fit each time it is used without overstressing the conductive silicone component. It also provides a consistent connection without variation issues incumbent in tight tolerance connectors.

Figure 5:
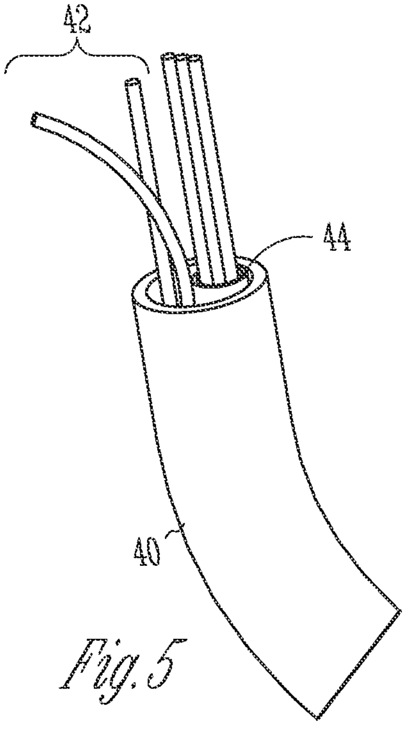
FIG. 5 shows a wiring configuration of the cable of the modular connection assembly of FIG. 1, according to one embodiment of the present subject matter.

FIG. 5 shows a wiring configuration of the cable of the modular connection assembly of FIG. 1, according to one embodiment of the present subject matter. In the example provided herein, five (5) wires are used to connect to the five point connector of FIG. 1; however, it is understood that a different number of wires and connections can be used without departing from the scope of the present subject matter. In the example provided herein, cable 40 includes a twisted pair 42 and a shielded wire bundle 44. Twisted pair 42 can be used for applications such as receiver connections where the twisting reduces conduction of certain types of electromagnetic interference. Shielded wire bundle 44 is useful for connections such as microphone connections. The shield is made of any conductive and flexible material, included, but not limited to, braided stainless steel. The shield assists in reducing crosstalk between connections of the microphone and receiver, in applications where a microphone and receiver are used. It is understood that different numbers of conductors may be employed and that other forms of electromagnetic shielding or management may be performed. In one embodiment, the shielding is connected to other electronics or to an equipotential surface. In one embodiment, the shielding is not connected to other electronics or to an equipotential surface. In various embodiments a ferrite is used to limit electromagnetic interference. Other approaches are possible without departing from the scope of the present subject matter.

Figure 6A:
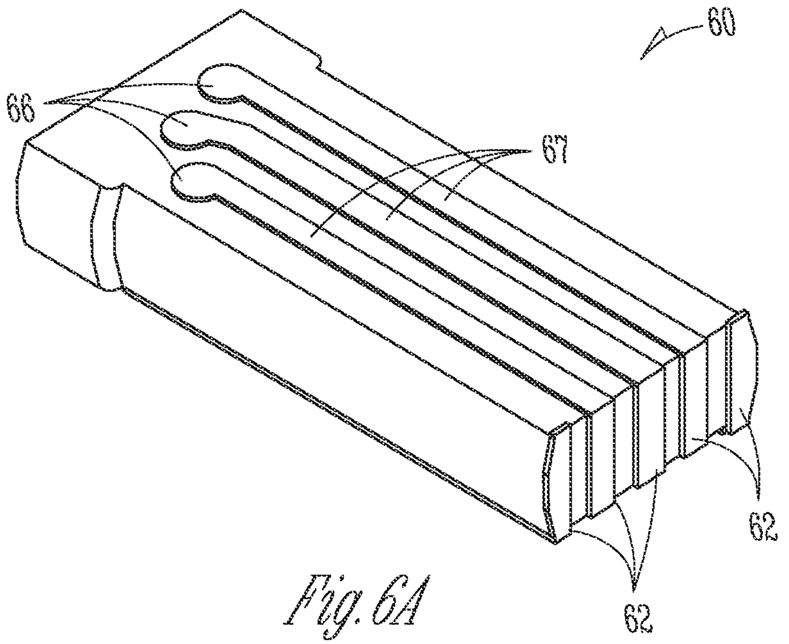
FIG. 6A shows a top view of an injection molded circuit connector (IMC connector), according to one embodiment of the present subject matter.
Figure 6B:
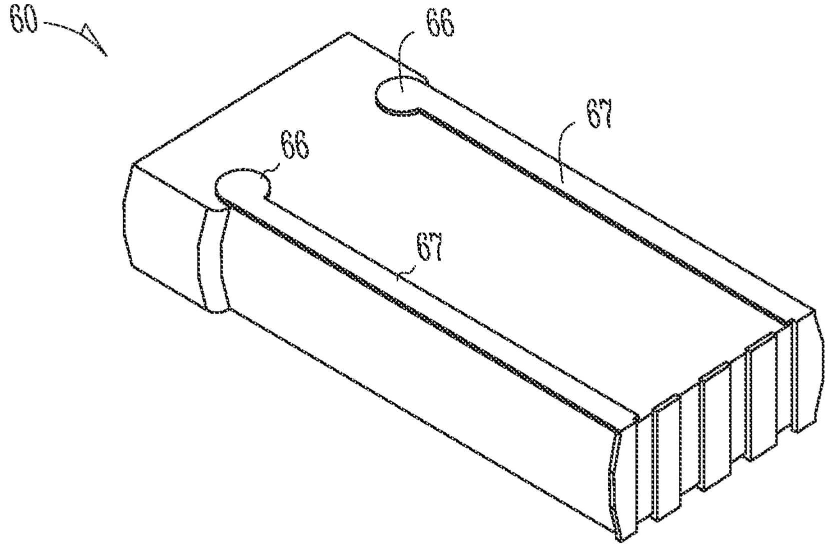
FIG. 6B shows a bottom view of the IMC connector of FIG. 6A, according to one embodiment of the present subject matter.
Figure 6C:
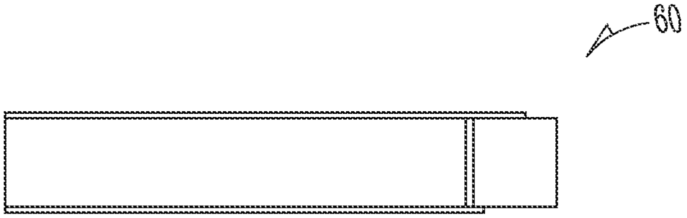
FIG. 6C shows a side view of the IMC connector of FIG. 6A, according to one embodiment of the present subject matter.
Figure 6D:
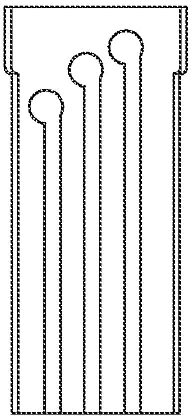
FIG. 6D shows a top view of traces of the IMC connector of FIG. 6A, according to one embodiment of the present subject matter.
Figure 6E:
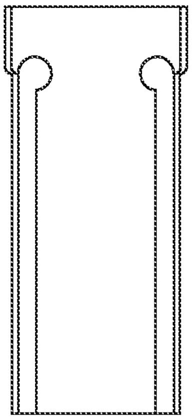
FIG. 6E shows a bottom view of traces of the IMC connector of FIG. 6A, according to one embodiment of the present subject matter.
Figure 6F:
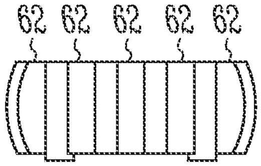
FIG. 6F shows an end view of traces of the IMC connector of FIG. 6A, according to one embodiment of the present subject matter.

FIGS. 6A and 6B show a top view and a bottom view of an injection molded circuit connector (IMC connector), according to one embodiment of the present subject matter. The IMC 60 includes connection pads 66, traces 67, and contacts 62. Detailed views of the traces are shown in FIGS. 6D and 6E, according to one embodiment. A side view of IMC 60 is shown in FIG. 6C. An end view of IMC 60 is shown in FIG. 6F. In various embodiments, the contacts are conformed to a shape that is consistent with the IMC 60 cross section. That is shown in FIG. 6F as rounded contacts at the extreme ends of the connector. It is understood that the contacts can be patterned in a variety of shapes and configurations, without departing from the scope of the present subject matter. It is understood also that the contacts may be symmetrical or asymmetrical as desired for any particular design.

Figure 6G:
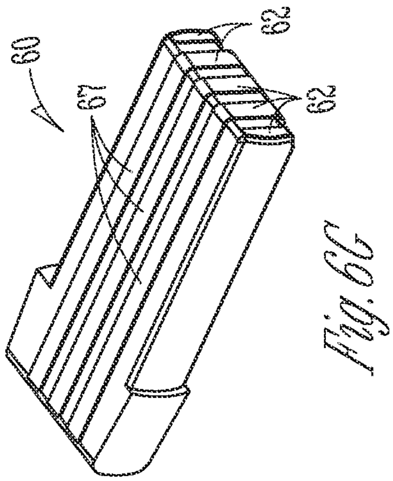
FIGS. 6G-6L show various views of an IMC connector according to one embodiment of the present subject matter.
Figure 6H:
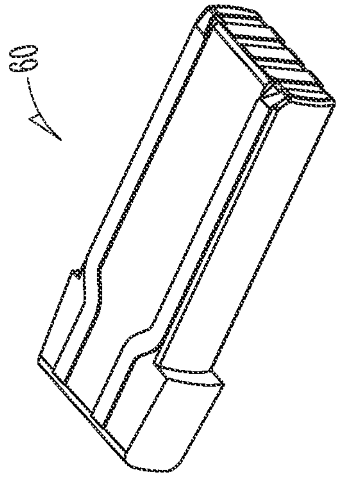
Figure 6I:
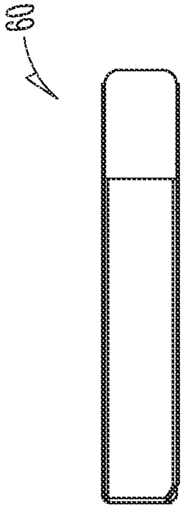
Figure 6J:
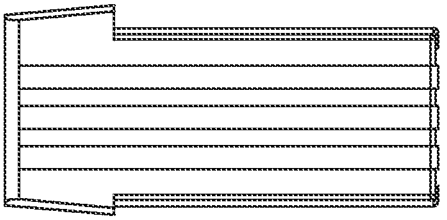
Figure 6K:
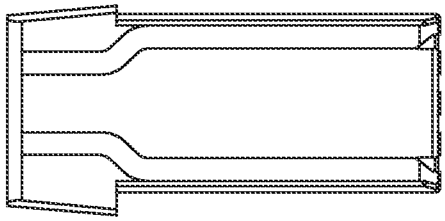
Figure 6L:
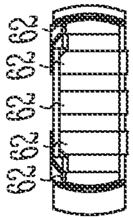

Another embodiment of IMC 60 is shown in FIGS. 6G, J, K, and L. In the embodiment shown in FIGS. 6G to 6L, the traces 67 are continuous to both ends of IMC 60 and contacts 62 can be connected to the opposite end of the connector via traces 67. Although FIGS. 6G to 6L relate to a 5 connection example, it is understood that other numbers of connections may be made without departing from the scope of the present subject matter.

WIC 60 can be used in connector 20, connector 30, or in both connectors. Use of the same IMC can reduce overall cost of manufacture and provide consistent connection designs.

Figure 7:
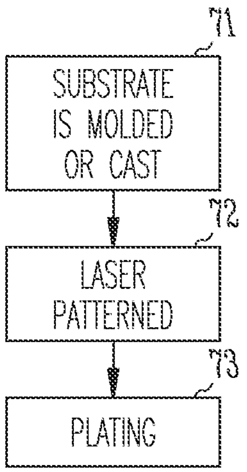
FIG. 7 shows a process for construction of an IMC connector, according to one embodiment of the present subject matter.
Figure 8A:
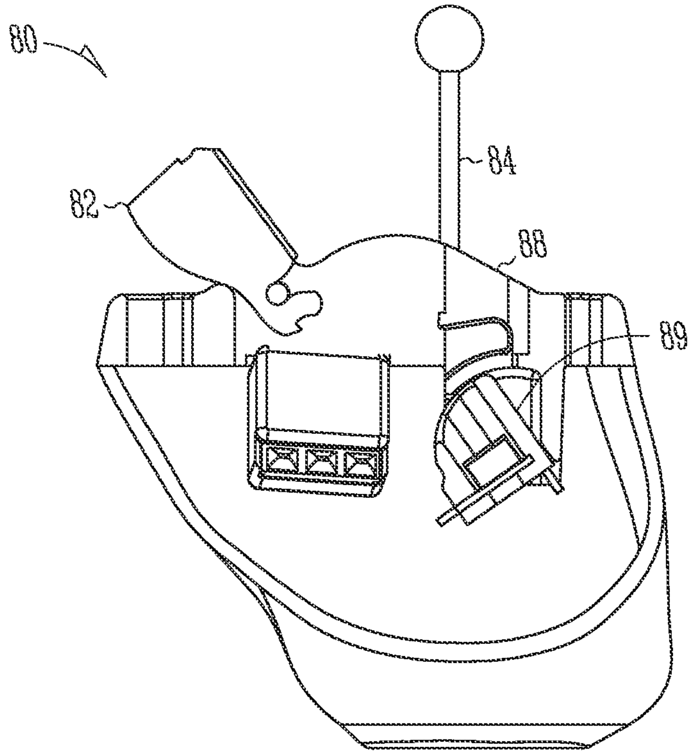
FIGS. 8A-8E demonstrate a process for connecting a device having a faceplate to the second connector of the modular connection assembly, according to one embodiment of the present subject matter.
Figure 8B:
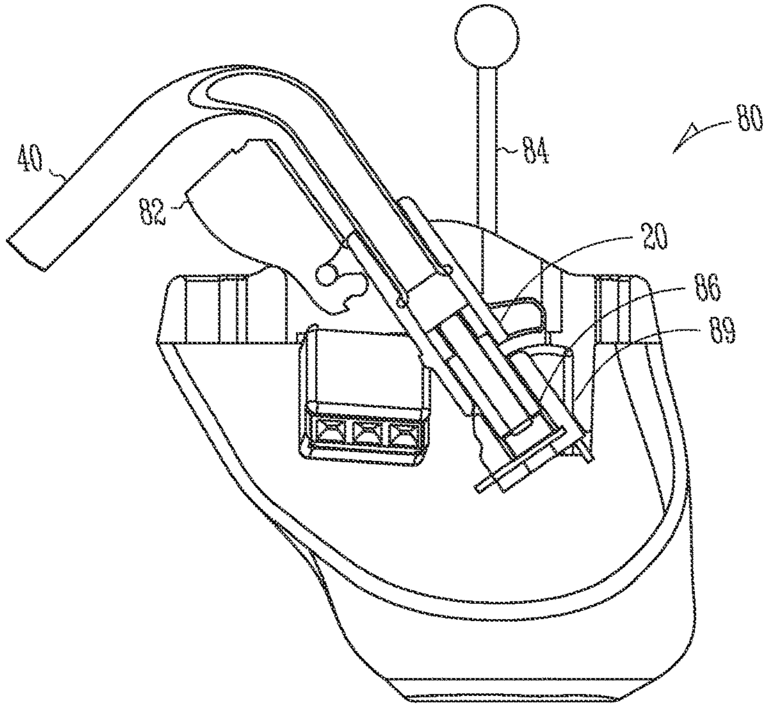
Figure 8C:
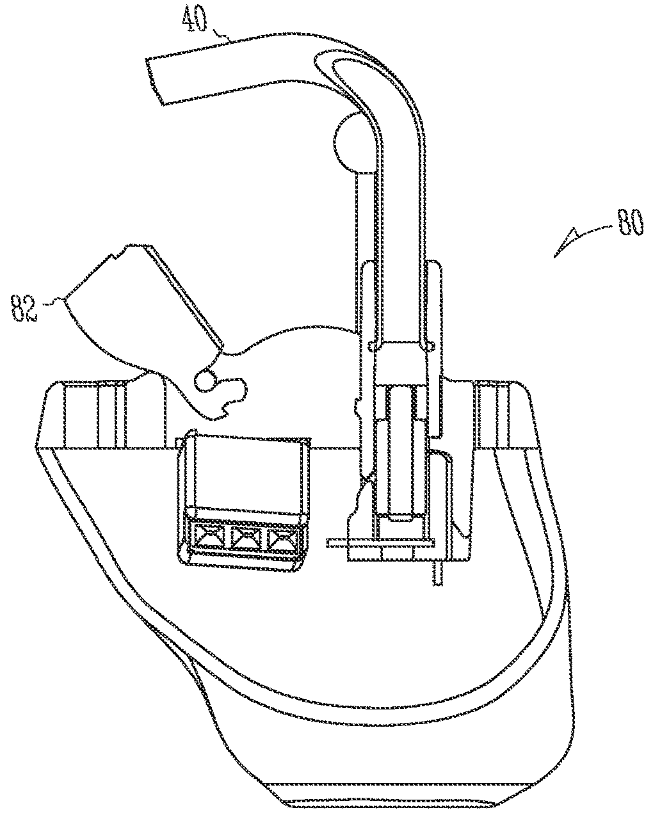
Figure 8D:
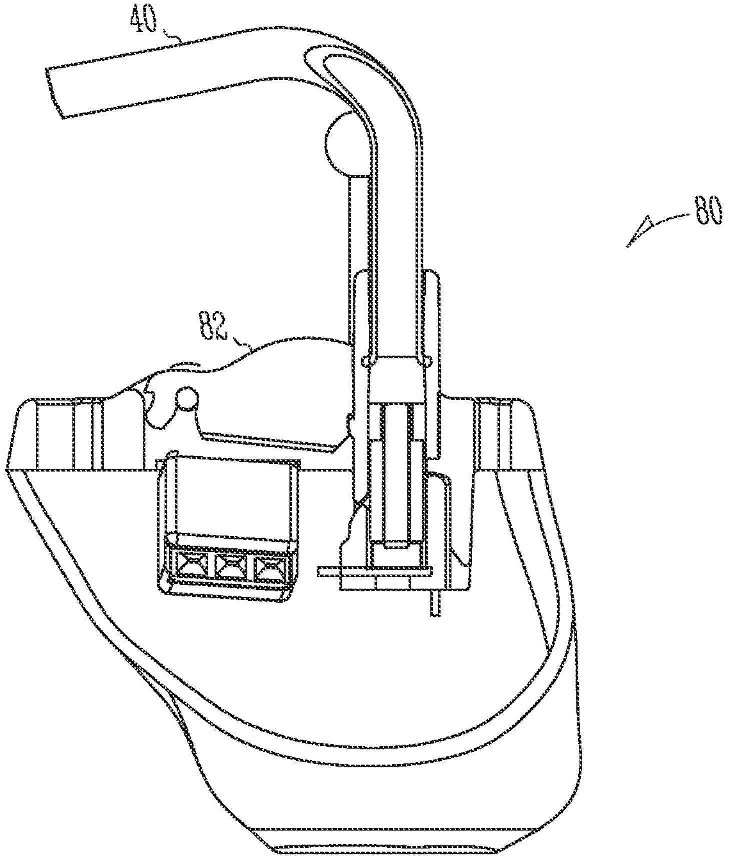
Figure 8E:
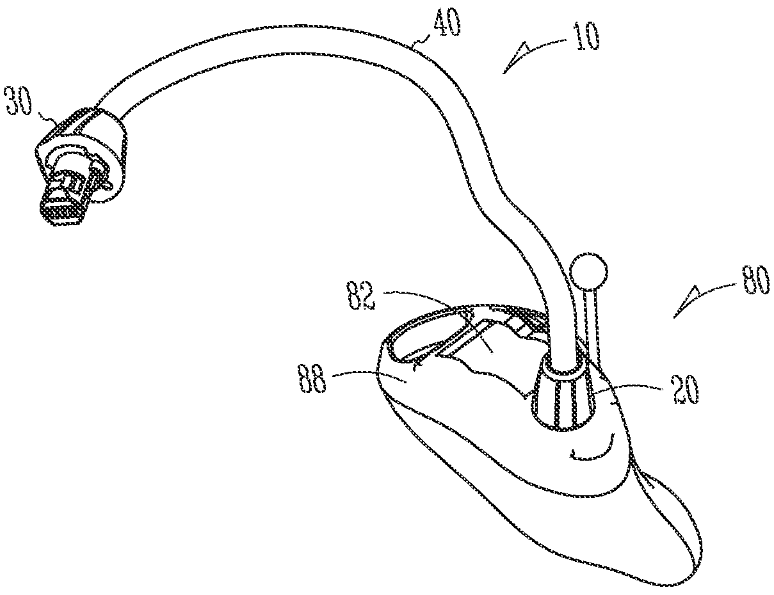

FIG. 7 shows a process for construction of an IMC connector, according to one embodiment of the present subject matter. In this process the connector substrate is molded or cast 71. Such fabrication may include, but is not limited to, injection molding. The substrate is then laser patterned to provide patterns including one or more of connection pads, traces, and contacts 72. The substrate is then plated with conductive material to provide the one or more of the connection pads, traces and contacts 73. In one application, Laser Direct Structuring (IDS) technology is used to create molded interconnect devices. One such process is provided by TYCO. The processes discussed herein are used to demonstrate only some processes, but it is understood that other processes are possible without departing from the scope of the present subject matter.

in various embodiments, the electronics connected to the first connector 20 and the second connector 30 include a mating receptacle to make a positive mechanical connection and provide good electrical connections. FIGS. 8A-8E demonstrate a process for connecting a device having a faceplate to a connector of the modular connection assembly, according to one embodiment of the present subject matter. Device 80 is adapted to be worn by a user of a hearing assistance device. It has a faceplate 88 with a retainer door 82. In FIG. 8A the retainer door 82 is open to allow a connector to be inserted into receptacle 89, according to one embodiment of the present subject matter. Handle 84 is optional and may be used by the wearer to place the device 80 in or about the ear canal of the wearer. In embodiments of device 80 which include a microphone and a receiver, the five point electrical connector and cable provided herein can provide microphone and receiver connections. In one embodiment, the connector 20 is inserted into the receptacle 89 and a positive stop is used to seat the connector, which mechanically compresses the conductive silicone portion 86 as discussed herein. In various embodiments a key slot molded into the retainer door 82 is used to guide the connector into the right orientation in receptacle 89 (FIG. 8B). The connector 20 is rotated to a vertical position in FIG. 8C. The retainer door 82 is closed to lock the connector 20 in place as demonstrated by FIG. 8D. The modular connection assembly 10 and device 80 are now connected both electrically and mechanically. In various embodiments, the connection is water resistant, water proof, and/or tamper proof. It is understood that other receptacle configurations and other devices may be used without departing from the scope of the present subject matter. The other connector 30 can be attached to a RIC device, RITE device, BTE device, or some other device, including, but not limited to a device that is over the ear. One such RIC device, such as the ZON™ by Starkey Laboratories, Inc.

Figure 9:
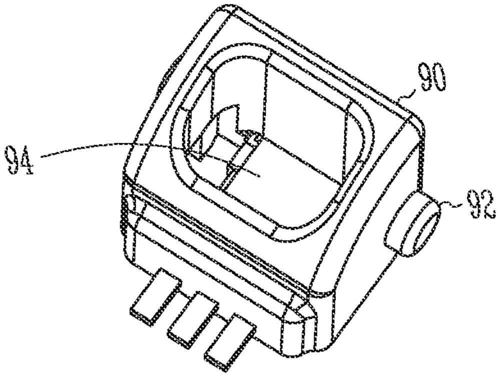
FIG. 9 demonstrates one example of how contacts are disposed in a receptacle, according to one embodiment of the present subject matter.
Figure 10:
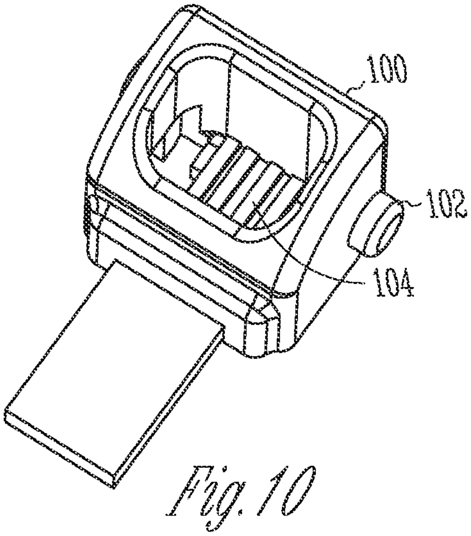
FIG. 10 demonstrates one example of how contacts are disposed in a receptacle, according to one embodiment of the present subject matter.
Figure 11:
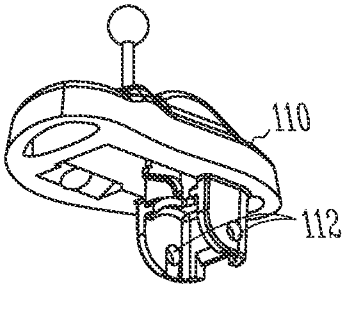
FIG. 11 demonstrates a "hanging basket" faceplate design, according to one embodiment of the present subject matter.

FIG. 9 demonstrates one example of how contacts are disposed in a receptacle, according to one embodiment of the present subject matter. A high temperature polymer is used to provide insert molded metal contacts 94 for the receptacle 90. The nub or extension 92 can be used to make a pivoting assembly, such as with the "hanging basket" faceplate design 110 of FIG. 11. The nubs or extensions 92 can fit into apertures 112 to make a pivoting assembly. Another design for a receptacle is found in FIG. 10, where receptacle 100 includes a molded in flex or IMC insert 104 for contacts. Nubs or extensions 102 can fit into apertures 112 to make a pivoting assembly. In various embodiments, the nubs serve as a retention mechanism, but are not pivoting. Other receptacle and contact designs are possible without departing from the scope of the present subject matter.

Figure 12:
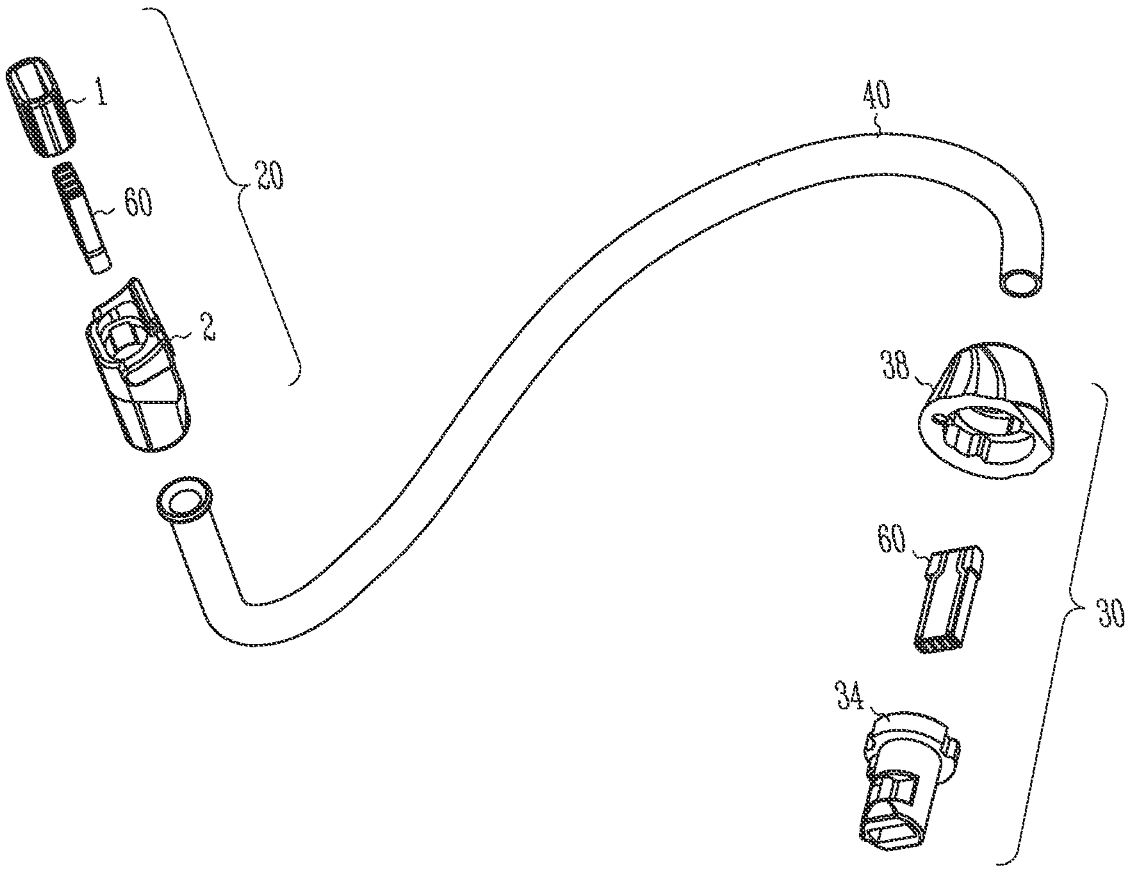
FIG. 12 shows an exploded view of the modular connection assembly, according to one embodiment of the present subject matter.
Figure 13:
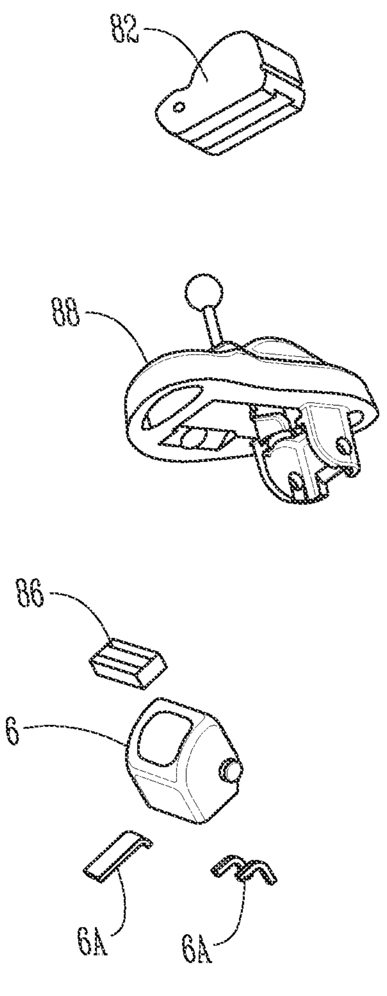
FIG. 13 shows an exploded view of a faceplate with receptacle in a "hanging basket" configuration, according to one embodiment of the present subject matter.

FIG. 12 shows an exploded view of the modular connection assembly, according to one embodiment of the present subject matter. Plug portions 1 and 2 of connector 20 surround MC 60, which is soldered to wires in cable 40 in one embodiment. Plug portions 38 and 34 surround MIC 60 of connector 30, which is soldered to the wires in cable 40 in one embodiment. FIG. 13 shows that the retainer door 82 is adapted to be mounted in faceplate 88 and a conductive silicone layer 86 is adapted to provide connections to contacts 6A mounted in receptacle 6.

Figure 14:
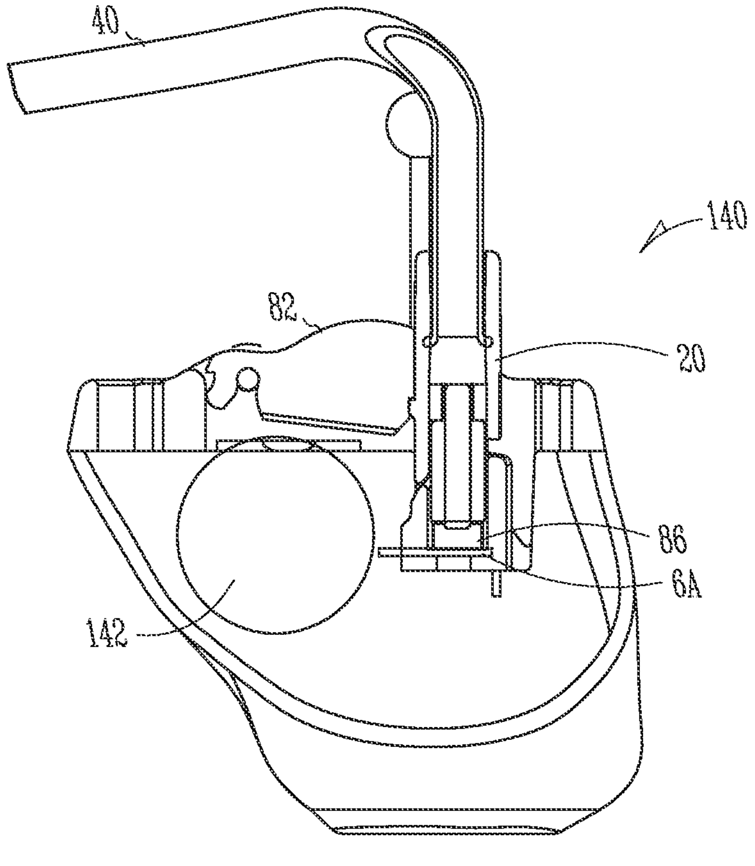
FIG. 14 demonstrates one use of the modular connection assembly with active components, according to one embodiment of the present subject matter.

FIG. 14 demonstrates one use of the modular connection assembly with active components, according to one embodiment of the present subject matter. The device 140 includes battery 142 which powers one or more components in device 140. A retainer door 82 holds the connector in place and compresses the connector against conductive silicone layer 86, which in turn provides connection to contacts 6A disposed in the receptacle.

It is understood that various embodiments of the present subject matter provide a polymer housing and the ability to include a three-dimensional injection molded circuit which has a number of contacts. In various embodiments the injection molding (PPA, LCP) includes a 5 contact insert. The conductive silicone pad provides redundant connection and insulation bars in an existing hearing assistance device housing. It is understood that 2, 3, or 5 contacts can be utilized from the same flex.

It is understood that the modular connection assembly can be used to connect hearing assistance electronics with one or more other devices, including, but not limited to a receiver, a telecoil, a sensor, a microphone, and/or combinations thereof. In one application a receiver that is adapted to be placed in an open ear configuration is designed to connect to connector 20 and a receiver-in-the ear or RIC device is adapted to connect to connector 30. In various embodiments, connectors 20 and 30 can be interchangeable. In various applications the receiver includes a mechanism to position the receiver within the ear canal. Other apparatus can be included, such as another receiver or one or more of a telecoil or microphone or sensor. Other variations exist without departing from the scope of the present subject matter. Some variations include, but are not limited to, the following additional combinations; however, it is understood that the present subject matter is not so limited. In various embodiments, the connections are used for a receiver connection in the ear and/or ear canal. Such designs can provide increased performance in gain and output. In various embodiments, the connections are used for both a receiver and a telecoil placed closer to the ear canal. This allows for more enhanced usage with telephones and more natural positioning of a telecoil near the ear canal. In various embodiments, the connections are used for a receiver and one or more microphones. Such embodiments allow for directional or array microphones with enhanced directionality and/or localization. Such embodiments also provide the ability to use the connections for one or more microphones to receive sounds for real ear measurement. In various embodiments, the microphones can be situated on both sides of an ear mold or an ear bud, thereby providing sensing in the canal as well as at the opening of the ear. Consequently, the use of microphones near the ear can alleviate space limitations in the behind-the-ear or over-the-ear electronics, in various embodiments. Other sensors may be connected using the present system. For example, a GMR sensor (giant magnetoresistive sensor) or TMR (tunneling magnetoresistive sensor) may be connected using the present system. Multiple receivers can also be connected to produce devices capable of transmitting sound on either side of the ear bud or earmold to provide functions, such as noise cancellation. Additional combinations include, but are not limited to one or more microphones and a telecoil, one or more microphones and a GMR or TMR sensor, for example. Additional embodiments provide connections and optionally conductors for antennas. The present connection system also allows for rechargeable applications and technology. Thus, the present subject matter provides connections for a number of available configurations and for a variety of devices. The present connector can also be rapidly replaced for situations where the sensor and/or receiver at the end is desired to be changed. In embodiments where the components situated near the ear are integrated with the connector, the entire connector and component combination can be quickly and reliably interchanged.

Figure 15:
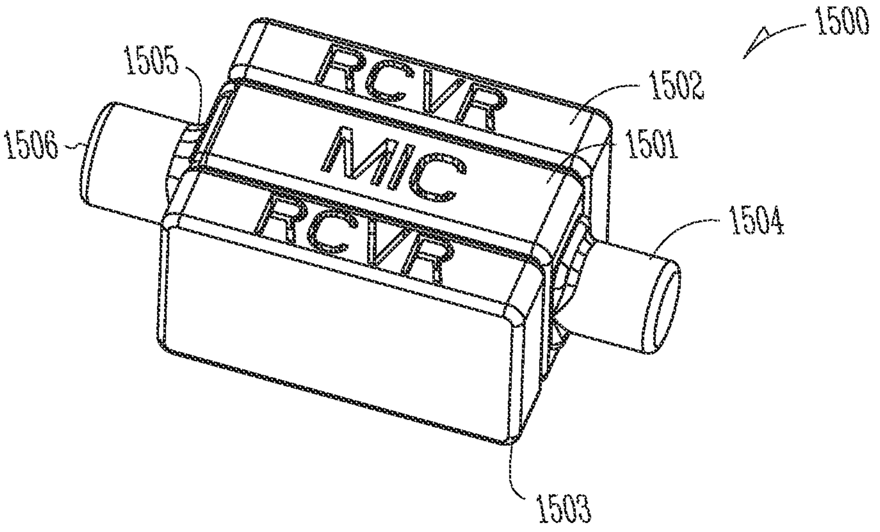
FIG. 15 shows a microphone and receiver assembly, according to one embodiment of the present subject matter.

FIG. 15 shows an isometric view of a microphone and receiver assembly 1500 according to one embodiment of the present subject matter. The assembly includes a microphone 1501 mounted between two receivers 1502, 1503. The assembly includes an acoustic spout 1504 for the microphone and an acoustic manifold 1505 with a port 1506 for the two receivers. In various embodiments, the microphone does not include a spout. The proximity of a microphone to a receiver in hearing assistance devices and the respective boundary conditions has been a factor in managing feedback. These constraints, historically, have negatively affected the final size of hearing assistance devices because the necessary suspension systems and multi layer barriers add size. The assembly 1500 reduces the need for the support systems and barriers by placing the microphone 1501 between two receivers 1502, 1503 oriented such that the receiver diaphragms counteract each other in a manner that substantially negates receiver vibration paths into the microphone 1501. In various embodiments, the assembly 1500 is enclosed in a housing adapted for wearing in the ear of a user.

Figure 16:
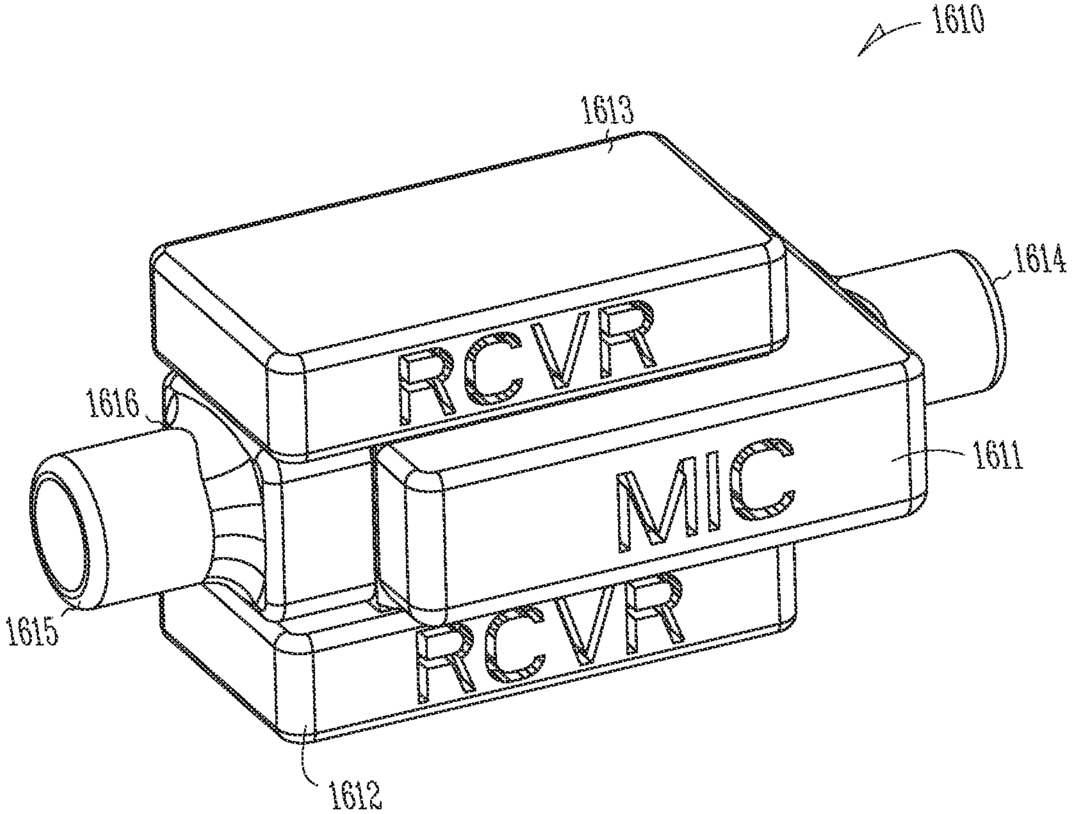
FIG. 16 shows a microphone receiver assembly with the microphone offset between the two receivers, according to one embodiment of the present subject matter.

FIG. 16 shows an isometric view of a microphone receiver assembly 1610 according to one embodiment of the present subject matter with the microphone 1611 offset between the two receivers 1612, 1613. Such a configuration reduces the size of the receiver manifold 1616 from the embodiment of FIG. 15 and provides additional separation between the microphone input 1614 and the receiver opening 1615. As illustrated in FIG. 16, the dimensions of the microphone 1611, such as the width, may be different than the dimensions of the receivers 1612, 1613 in various embodiments. Acoustic requirements of each application of the assembly often dictate the dimension of the receivers, the microphone or the receivers and the microphone. In some embodiments, the assembly connects to a connector assembly according to the present subject matter for further connection to a second device. The second device can include, for example, but is not limited to, a behind-the-ear type device, a receiver-in-the-ear (receiver-in-the-canal) type device, or an over the ear type of device.

In various embodiments, the components of the microphone receiver assembly are mounted rigidly to each other to form the assembly and to reduce additional vibration sources. Mounting techniques include, but are not limited to, mechanical fasteners, welding including laser welding, and gluing.

Figure 17:
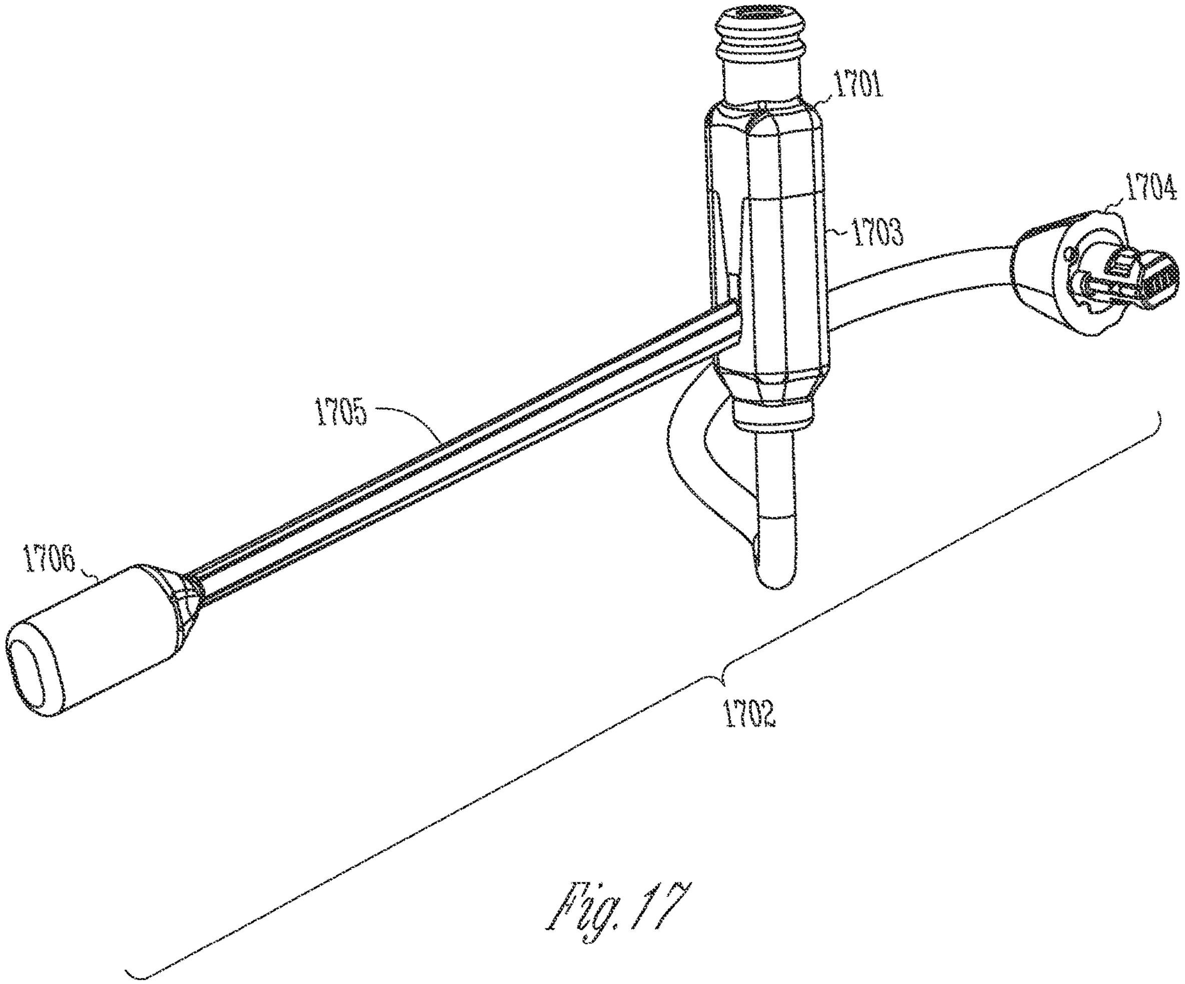
FIG. 17 shows a modular connection assembly with an integrated telecoil, according to one embodiment of the present subject matter.
Figure 18:
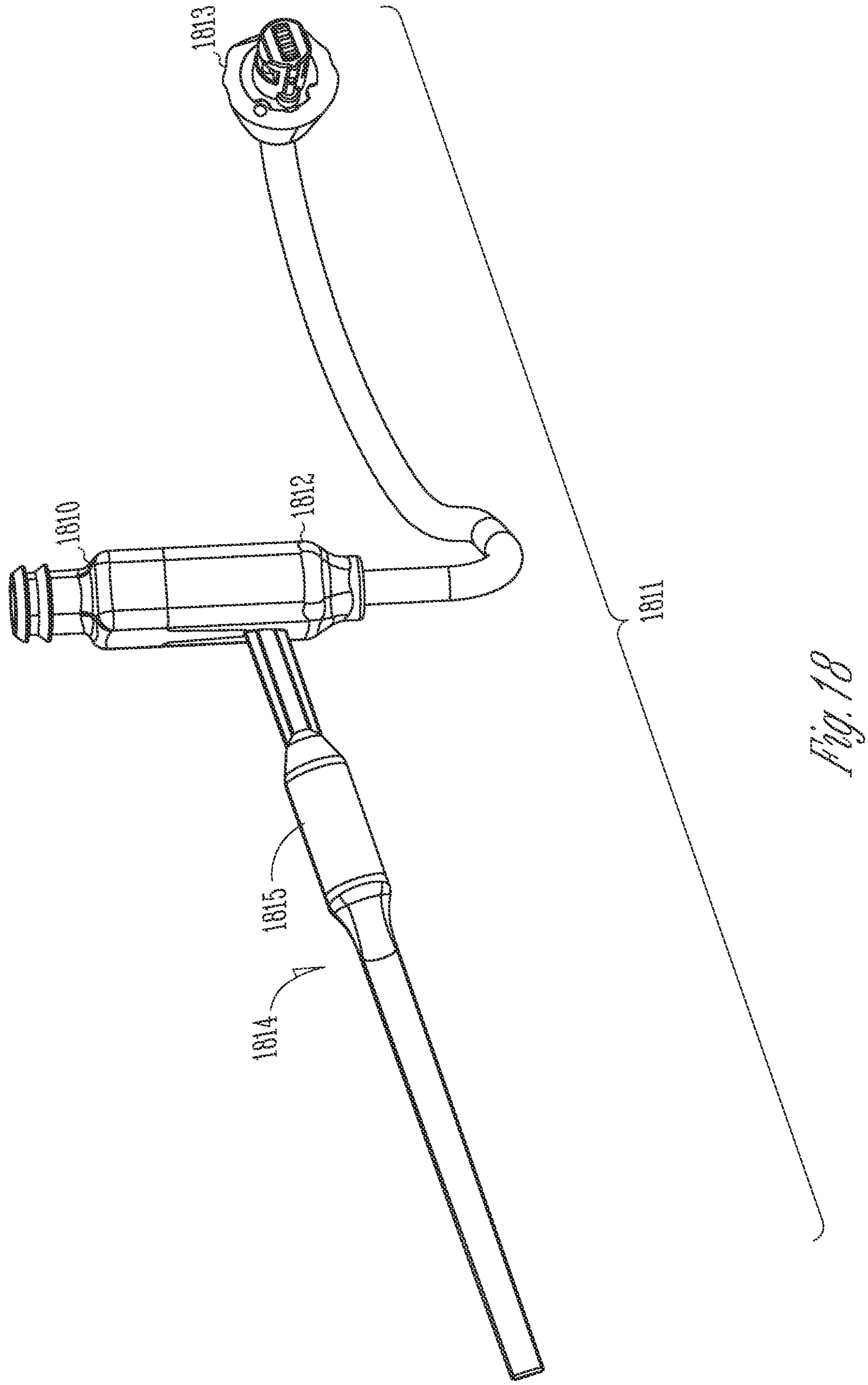
FIG. 18 shows a modular connection assembly with an integrated telecoil, according to one embodiment of the present subject matter.

FIG. 17 shows a modular connection assembly with an integrated telecoil according to one embodiment of the present subject matter. A receiver, contained in upper housing 1701 is connected to the modular connection assembly 1702. In various embodiments the connection is performed using a first connector, encased in lower housing 1703 which provides electrical and mechanical connections to the receiver. The modular connection assembly 1702 includes a second connector 1704 for connecting to a hearing assistance device. The lower housing 1703 is attached to a flexible retention device 1705 with an integrated telecoil 1706. The retention device conforms to a wearer's ear anatomy so that the receiver in upper housing 1701 is retained within a user's ear in a stable and comfortable manner. In various embodiments, such as that demonstrated by FIG. 17, the telecoil 1706 is positioned at a distal end of the retention device 1705. The retention device 1705 includes conducting wires to connect the telecoil 1716 to connector 1704. Such conductors may include contacts which are detachable at lower housing 1703. These contacts can be a separate connector for quick assembly and disassembly, or can be soldered to make the connection. In various embodiments, the conductors from telecoil 1706 extend through the modular connection assembly 1702 to connector 1704. In various embodiments, such as that demonstrated in FIG. 18, the telecoil 1815 is located near the receiver in upper housing 1810 so that the distal end of the retention device 1814 can be trimmed if desired without affecting the electrical nature of the device. This provides the ability to customize retention device 1814 of modular connection assembly 1811. The connections of the telecoil 1815 can be made by a variety of connector and wiring options including those discussed above for the design of FIG. 17. Thus, a connector in lower housing 1812 can be used to make connections between connector 1813 and a receiver in upper housing 1810 and the telecoil 1815 using the five (5) wire (or other number of wires) harness set forth herein.

Figure 19:
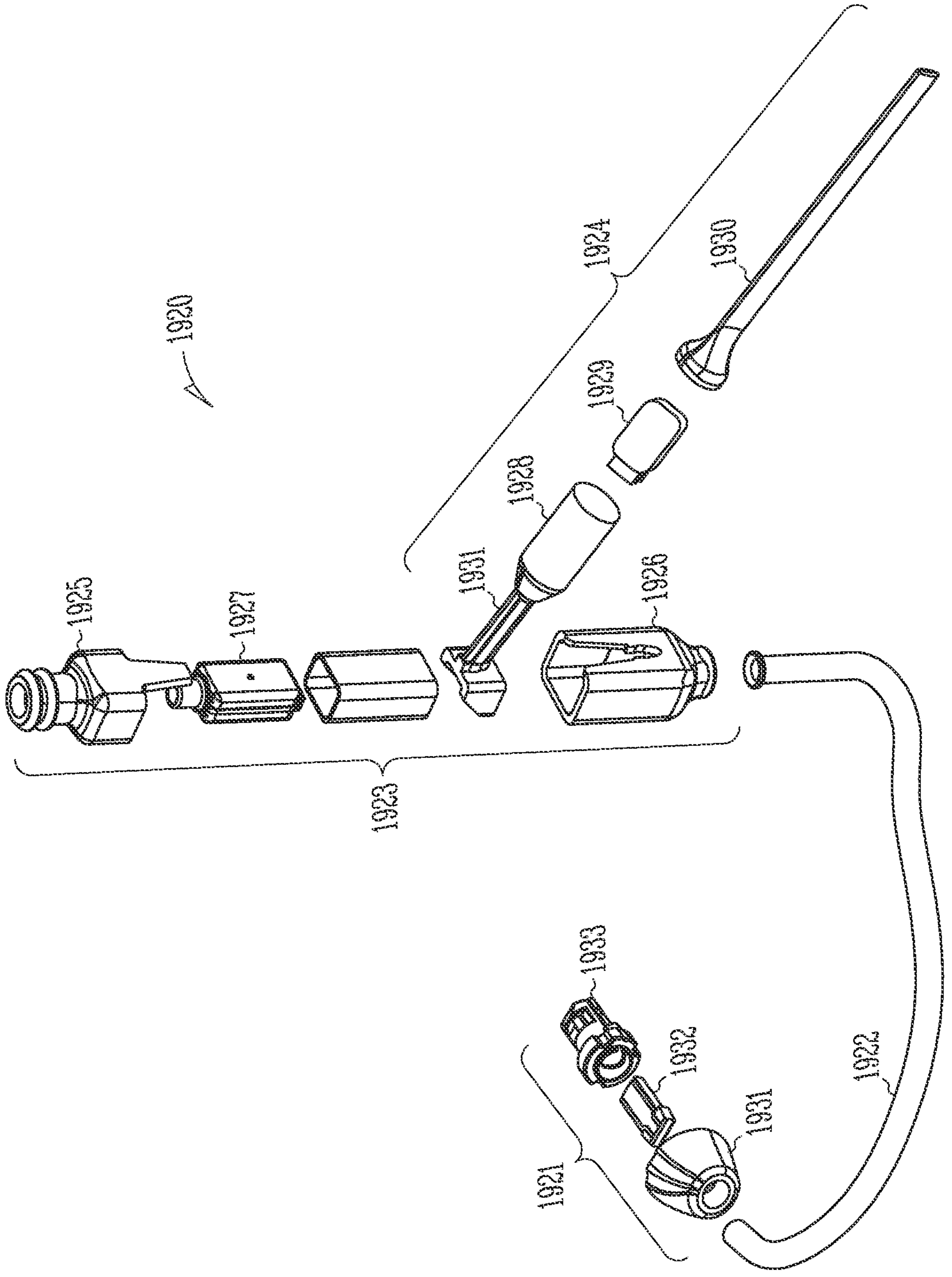
FIG. 19 shows an exploded view of a modular connection assembly for a receiver with an integrated telecoil, according to one embodiment of the present subject matter.

FIG. 19 shows an exploded view of a modular connection assembly 1920 for a receiver with an integrated telecoil, according to one embodiment of the present subject matter. The modular connection assembly includes a connector portion 1921, cable tubing 1922, receiver assembly 1923 and a telecoil assembly 1924. The receiver assembly 1923 is configured for positioning a receiver in an ear of a wearer. The receiver assembly 1923 includes an upper housing 1925, a lower housing 1926 and a receiver 1927. The upper

1925 and lower 1926 receiver housings enclose the receiver 1927. Such receivers include, but are not limited to a Pulse 4400 receiver or a Knowles FK receiver. It is understood that other receivers may be used without departing from the scope of the present subject matter. The receiver 1927 is electrically connected to conductors (not shown) passing through the cable tube 1922. In various embodiments, the conductors are soldered to the receiver 1927. In various embodiments, receiver conductors are a twisted pair of conductors.

As demonstrated by the embodiment of FIG. 19, the telecoil assembly 1924 couples to the receiver assembly 1923. The telecoil assembly 1924 includes a telecoil housing 1928, a telecoil 1929 and a retention element 1930. The telecoil housing 1928 assembles with the upper 1925 and lower 1926 receiver housings. Telecoil conductors pass through a conduit in the connecting portion 1931 of the telecoil housing 1928 from the lower receiver housing 1926 to connect to the telecoil 1929, such as a TA32, 3-pin active telecoil, for example. It is understood that other telecoils may be used with the telecoil assembly without departing from the scope of the present subject matter, including, but not limited to, other active telecoils, other 3-pin telecoils, and 2-pin telecoils, including passive telecoils. In various embodiments other magnetic sensing and/or demodulating sensors are employed. For example, a GMR or MIR sensor may be used in conjunction with or instead of the telecoil, according to various embodiments. In various embodiments, the telecoil 1929 (or other sensor) is soldered to shielded conductors and is enclosed in the telecoil housing upon assembly. A flexible retention element 1930 couples to the telecoil housing 1928 to enclose the telecoil 1929. The retention element 1930 is designed to conform to a wearer's ear anatomy so that the receiver assembly 1923 is retained within the wearer's ear in a stable and comfortable manner. It can be trimmed to a desired length for a better fit if needed.

Conductors pass through cable tubing 1922 that is coupled to the lower housing 1926 of the receiver assembly 1923. The tubing 1922 can be made of any flexible material, including, but not limited to, PEBAX. Reinforced tubing, such as reinforced PEBAX may be used. Opposite the receiver assembly 1923, the tubing 1922 connects to a connector assembly 1921. In various embodiments, the connector assembly 1921 is a generic connector for connecting the modular connection assembly 1920 to the electronics of a hearing assistance device. In some embodiments, the connector assembly 1921 is a connector assembly according to the present subject matter (see FIG. 12, assembly 30 and FIG. 6 generally). The illustrated connector assembly 1921 includes a strain relief 1931 for connecting to the cable tube 1922, a molded interconnect device 1932 for connecting to conductors in the cable tube 1922 and a connector housing 1933 to retain the interconnect device 1932 in the strain relief 1931 and mechanically couple the connector assembly 1921 to a hearing assistance device such as a RIC hearing assistance device, for example. The molded interconnect device 1932 includes connection pads, traces, and contacts for connecting to conductors in the cable tube and providing contacts for electrically connecting modular connection assembly 1920 to a hearing assistance device. In various embodiments, conductors from in the cable tube 1922 are soldered to contact pads of the molded interconnect device 1932. In some embodiments, the molded interconnect device 1932 uses conductive silicone to connect to a hearing assistance device. Several embodiments are provided herein. It is understood that other methods of connecting the conductors to the molded interconnect device and the molded interconnect device to a hearing assistance device are possible without departing from the scope of the present subject matter.

Figure 20:
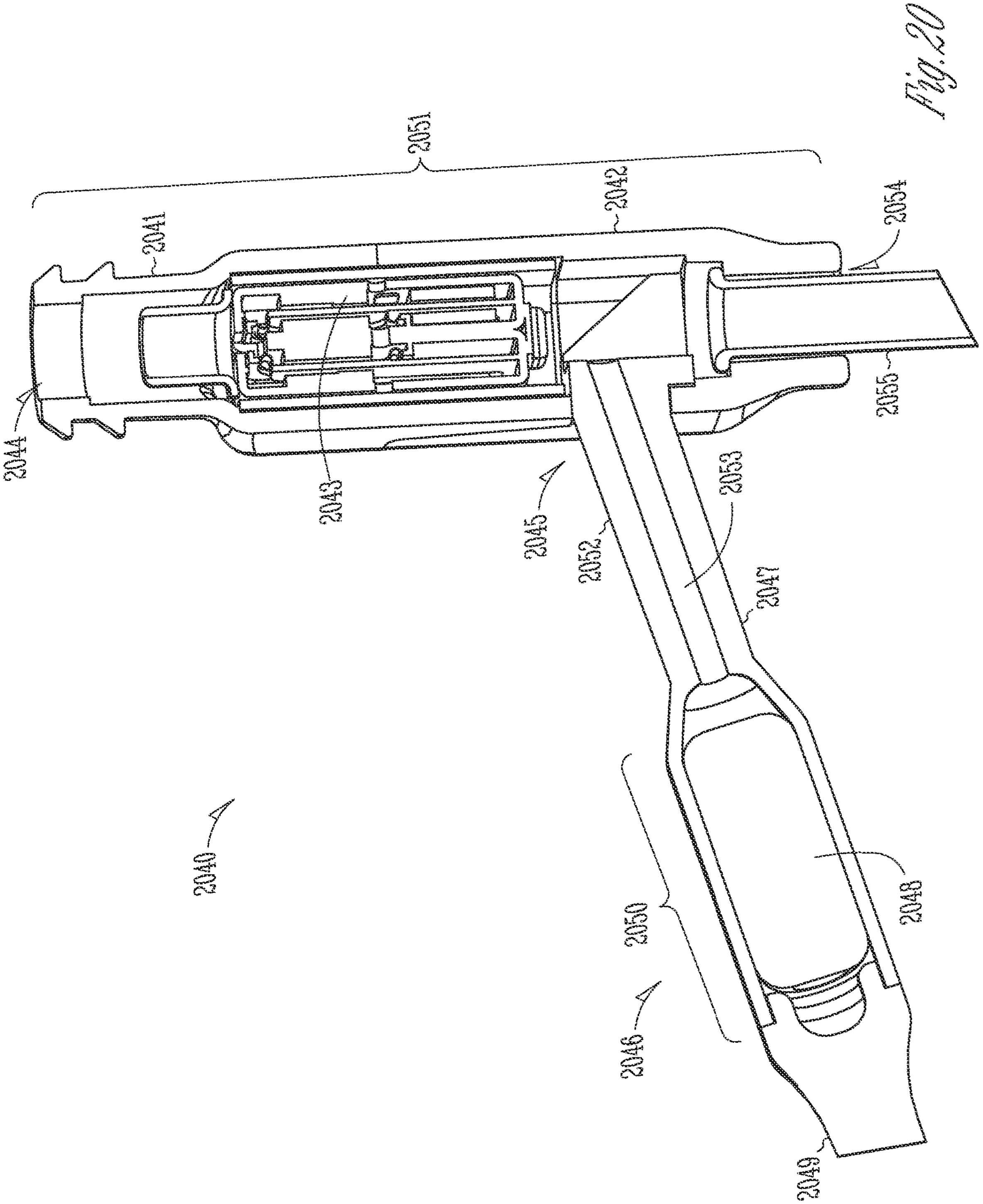
FIG. 20 shows a cross-section view of a portion of an assembled modular connection assembly, according to one embodiment of the present subject matter.

FIG. 20 shows a cross-section view of a portion of an assembled modular connection assembly 2040 according to one embodiment of the present subject matter. The view includes an upper receiver housing 2041 and a lower receiver housing 2042 enclosing a receiver 2043. The upper receiver housing 2041 includes an acoustic opening 2044 for directing sound from the receiver 2043 to a wearer's ear. The assembled upper 2041 and lower 2042 receiver housings form an opening 2045 for coupling a telecoil assembly 2046 to the upper and lower receiver housings. The telecoil assembly 2046 includes a telecoil housing 2047, telecoil 2048 and retention element 2049. The telecoil housing 2047 includes a cavity 2050 for housing the telecoil 2048. A retention element 2049 couples to the telecoil housing 2047 to enclose the cavity 2050. The retention element 2049 is designed to conform to a wearer's ear anatomy so that the receiver assembly 2051 is retained within the wearer's ear in a stable and comfortable manner. A connecting portion 2052 of the telecoil housing includes a conduit 2053 for passing telecoil conductors from the lower receiver housing 2042 to the telecoil 2048 in the cavity 2050. The lower receiver housing 2042 includes a cable opening 2054 for coupling to cable tubing 2055. Cable tubing protects receiver and telecoil conductors. The tubing 2054 can be made of any flexible material, including, but not limited to, PEBAX Reinforced tubing, such as reinforced PEBAX may be used.

The telecoil (or other sensor) can be eliminated by changing the modular connection assembly if desired, as opposed to purchasing a different hearing assistance device without a telecoil. The external location of the telecoil (or other sensor) allows for better sensing of local magnetic fields for switching the hearing assistance device into a telecoil mode. In some cases, the removal of the telecoil from an electronics housing, such as the housings used in a receiver-in-the-ear (RIC) design, make smaller housing designs possible. Manufacturing simplicity can be increased by placing the telecoil in the retention mechanism. Such designs can be pre-tested to assure proper operation of the telecoil portion of the device. Such designs may provide less product variability and more operational reliability than designs where the telecoil is mounted in the electronics housing of the RIC device.

It is understood that other positions of the telecoil or other sensor along the length of the retention mechanism are possible without departing from the scope of the present subject matter. In various embodiments, a shielded housing for the receiver reduces interference between the telecoil and the receiver. One type of shielding is magnetic shielding, such as mu-metal. It is understood that other magnetically permeable materials and apparatus can be used to form a shield about the receiver without departing from the scope of the present subject matter.

The present subject matter includes hearing assistance devices, including, but not limited to, cochlear implant type hearing devices, hearing aids; such as behind-the-ear (BTE), receiver-in-the-canal (RIC), receiver-in-the-ear (RITE), and such devices that include in-the-ear (ITE), in-the-canal (ITC), or completely-in-the-canal (CIC) type components. It is understood that behind-the-ear type hearing aids may include devices that reside substantially behind the ear or over the ear. Such devices may include hearing aids with receivers associated with the electronics portion of the behind-the-ear device, or hearing aids of the type having receivers in-the-canal. It is understood that other hearing assistance devices not expressly stated herein may fall within the scope of the present subject matter.

This application is intended to cover adaptations and variations of the present subject matter. It is to be understood that the above description is intended to be illustrative, and not restrictive. The scope of the present subject matter should be determined with reference to the appended claim, along with the full scope of legal equivalents to which the claims are entitled.

What is claimed is:

1. A modular connection assembly for a hearing assistance device, the assembly comprising:
- a connector portion configured to detachably connect to hearing assistance electronics disposed within a housing configured to be worn above an ear of a wearer;
- a receiver assembly connected to the connector portion using cable tubing, the receiver assembly configured for positioning a receiver in an ear of a wearer of the hearing assistance device; and
- a magnetic sensor assembly coupled to the receiver assembly, the magnetic sensor assembly including a magnetic sensor and a retention element configured to conform to ear anatomy of the wearer.

2. The assembly of claim 1, wherein the magnetic sensor includes a telecoil.

3. The assembly of claim 1, wherein the magnetic sensor includes a giant magnetoresistance (GMR) sensor.

4. The assembly of claim 1, wherein the magnetic sensor includes a tunnel magnetoresistance (TMR) sensor.

5. The assembly of claim 1, wherein the connector portion includes a five point connector.

6. The assembly of claim 1, wherein the connector portion includes a tamper proof connection.

7. The assembly of claim 1, wherein the connector portion includes a water proof connection.

8. The assembly of claim 1, wherein the cable tubing includes conductors for electrically connecting the receiver to the connector portion.

9. The assembly of claim 8, wherein the conductors include at least one twisted pair of wires.

10. The assembly of claim 8, wherein the conductors include a plurality of shielded wires.

11. A modular connection assembly for a hearing assistance device, the assembly comprising:
- a connector portion configured to detachably connect to hearing assistance electronics disposed within a housing configured to be worn above an ear of a wearer;
- a receiver assembly electrically connected to the connector portion using a plurality of wires, the receiver assembly configured for positioning a receiver in an ear of a wearer of the hearing assistance device; and
- a magnetic sensor assembly detachably coupled to the receiver assembly, the magnetic sensor assembly including a magnetic sensor.

12. The assembly of claim 11, wherein the magnetic sensor includes a telecoil.

13. The assembly of claim 11, wherein the magnetic sensor includes a giant magnetoresistance (GMR) sensor.

14. The assembly of claim 11, wherein the magnetic sensor includes a tunnel magnetoresistance (TMR) sensor.

15. The assembly of claim 11, wherein the magnetic sensor assembly is detachably coupled to the receiver assembly using a retention element configured to conform to ear anatomy of the wearer.

16. The assembly of claim 11, wherein the hearing assistance device is a hearing aid.

17. The assembly of claim 16, wherein the hearing aid is a behind-the-ear device.

18. The assembly of claim 16, wherein the hearing aid is a receiver-in-the-ear device.

19. The assembly of claim 16, wherein the hearing aid is a receiver-in-the-canal device.

20. The assembly of claim 11, wherein the receiver assembly includes a standard fit ear bud or a custom fit earmold.

* * * * *